US011011004B2

(12) United States Patent
Oozono et al.

(10) Patent No.: US 11,011,004 B2
(45) Date of Patent: May 18, 2021

(54) FACILITY OPERATION ASSISTANCE SYSTEM, FACILITY IMAGE CAPTURE DEVICE, AND FACILITY OPERATION ASSISTANCE METHOD

(71) Applicant: PANASONIC INTELLECTUAL PROPERTY MANAGEMENT CO., LTD., Osaka (JP)

(72) Inventors: Masashi Oozono, Kanagawa (JP); Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 16/464,219

(22) PCT Filed: Nov. 7, 2017

(86) PCT No.: PCT/JP2017/040029
§ 371 (c)(1),
(2) Date: May 24, 2019

(87) PCT Pub. No.: WO2018/105289
PCT Pub. Date: Jun. 14, 2018

(65) Prior Publication Data
US 2019/0392661 A1    Dec. 26, 2019

(30) Foreign Application Priority Data

Dec. 8, 2016  (JP) .............................. JP2016-238643

(51) Int. Cl.
*G07C 9/38* (2020.01)
*G06K 9/00* (2006.01)

(52) U.S. Cl.
CPC ........... *G07C 9/38* (2020.01); *G06K 9/00342* (2013.01); *G06K 9/00778* (2013.01)

(58) Field of Classification Search
CPC ... G06T 7/20; H04N 7/18; G06K 9/52; G06K 9/6215
See application file for complete search history.

(56) References Cited

U.S. PATENT DOCUMENTS

| 5,926,518 A | 7/1999 | Asokawa | |
|---|---|---|---|
| 2015/0294183 A1* | 10/2015 | Watanabe | G07C 9/28 382/203 |
| 2017/0178476 A1* | 6/2017 | Jeon | G08B 13/19656 |

FOREIGN PATENT DOCUMENTS

| JP | 5-143819 A | 6/1993 |
|---|---|---|
| JP | 10-049718 A | 2/1998 |

(Continued)

OTHER PUBLICATIONS

International Search Report issued in International Patent Application No. PCT/JP2017/040029, dated Jan. 23, 2018.

*Primary Examiner* — Joshua L Schwartz
(74) *Attorney, Agent, or Firm* — Greenblum & Bernstein, P.L.C.

(57) ABSTRACT

A server collects measurement data of a camera to efficiently generate statistical data relating to the number of entering and exiting persons, and present the data to a user. The camera includes image capture unit capturing an image of a doorway of a facility, processor detecting persons entering and exiting from the doorway based on captured images sequentially output from the image capture unit and generating measurement data relating to the number of entering and exiting persons for each predetermined period, and communication unit transmitting the measurement data output from the processor for each predetermined period to store server, and store server includes communication unit receiving measurement data for each predetermined period transmitted from camera, storage unit accumulating measurement data for each predetermined period received by the (Continued)

communication unit, and processor statistically processing measurement data for each predetermined period to generate statistical data for targeting one or more facilities.

13 Claims, 20 Drawing Sheets

(56) References Cited

FOREIGN PATENT DOCUMENTS

| | | |
|---|---|---|
| JP | 2001-175868 A | 6/2001 |
| JP | 3521637 | 2/2004 |
| JP | 2007-257497 A | 10/2007 |
| JP | 2010-033474 | 2/2010 |
| JP | 2012-073915 A | 4/2012 |
| JP | 2012-079351 | 4/2012 |
| JP | 5583451 | 7/2014 |
| JP | 2015-203912 | 11/2015 |
| JP | 2016-103728 | 6/2016 |

* cited by examiner

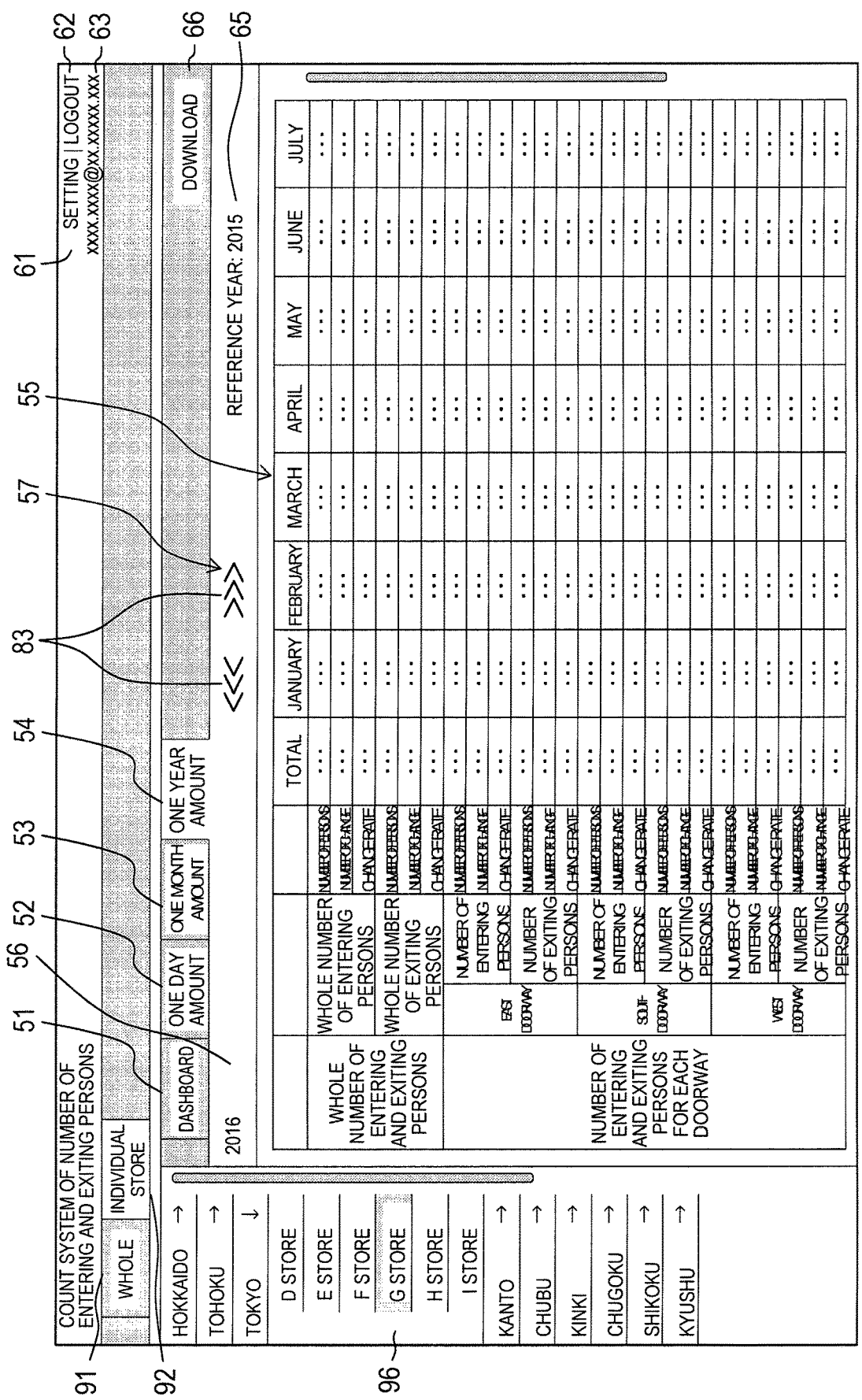

FACILITY OPERATION ASSISTANCE SYSTEM, FACILITY IMAGE CAPTURE DEVICE, AND FACILITY OPERATION ASSISTANCE METHOD

TECHNICAL FIELD

The present disclosure relates to a facility operation assistance system presenting statistical data relating to a situation of persons entering and exiting from doorways of one or more facilities to a user, a facility image capture device disposed in a facility and connected to a server device via a network, and a facility operation assistance method.

BACKGROUND ART

Cameras capturing an inside of a facility are installed in various kinds of facilities such as stores, and a system monitoring situations inside the facilities with captured images of the cameras are widely spread, and if persons entering and exiting from a doorway of the facility are detected by using the captured images of the cameras and the number of entering and exiting persons are measured, it can be used for purposes such as marketing by performing statistical processing on measurement data of the number of entering and exiting persons.

As a technology for measuring the number of persons entering and exiting from a doorway of the facility, conventionally, there is a known technology for capturing an image of a doorway using a camera, distinguishing between entering persons and exiting persons, and counting the persons based on a movement direction of the persons passing through a determination line set on the captured image (see PTL 1). There is a known technology in which a plurality of cameras are installed in a facility and the respective cameras count the number of persons entering and exiting from each doorway from captured images (see PTL 2).

CITATION LIST

Patent Literature

PTL 1: Japanese Patent No. 3521637
PTL 2: Japanese Patent No. 5583451

SUMMARY OF THE INVENTION

In the conventional technology, it is possible to distinguish between an entering person and an exiting person at a doorway of a facility and to count them, and to count the number of entering and exiting persons in each of a plurality of doorways provided in the facility. However, in a case where stores were installed in various places such as chain stores, there was no consideration on how to collect measurement data of cameras for each of a plurality of stores using a server located at a remote place, and how to statistically process the collected measurement data.

Therefore, the present disclosure is mainly aimed at providing a facility operation assistance system, a facility image capture device, and a facility operation assistance method capable of collecting measurement data of an image capture device with good timing using a server device, efficiently generating statistical data relating to the number of entering and exiting persons using the server device, and presenting the data to a user.

A facility operation assistance system according to the present disclosure is a facility operation assistance system presenting statistical data relating to a situation of persons entering and exiting from doorways of one or more facilities to a user, and is configured to include one or more image capture devices that are arranged in the facility, and a server device which is connected to the image capture device via a network, in which the image capture device includes an image capture unit capturing an image of a periphery of the doorway of the facility, a processor detecting persons entering and exiting from the doorway based on captured images that are sequentially output from the image capture unit and generating measurement data relating to the number of entering and exiting persons for each predetermined period, and a communication unit transmitting the, measurement data for the each predetermined period which is output from the processor to the server device, and in which the server device includes a communication unit receiving the measurement data for the each predetermined period which is transmitted from the image capture device, a storage unit accumulating the measurement data for the each predetermined period that is received by the communication unit, and a processor statistically processing the measurement data for the each predetermined period to generate the statistical data for targeting one facility or for targeting a whole of a plurality of facilities.

A facility image capture device according to the present disclosure is a facility image capture device that is disposed in a facility and is connected to a server device via a network, and is configured to include an image capture unit that captures an image of a periphery of a doorway of the facility, a processor that detects persons entering and exiting from the doorway based on captured images that are sequentially output from the image capture unit and generates measurement data relating to the number of entering and exiting persons for each predetermined period, and a communication unit that transmits the measurement data which is output from the processor for the each predetermined period to the server device, in which the processor transmits the measurement data for the each predetermined period to the server device in response to a transmission request which is transmitted from the server device for each predetermined period.

A facility operation assistance method according to the present disclosure is a facility operation assistance method of presenting statistical data relating to a situation of persons entering and exiting from doorways of one or more facilities to a user, in which one or more image capture devices arranged in the facilities captures images of a periphery of doorways of facilities using an image capture unit, detects persons entering and exiting from the doorways based on captured images that are sequentially output from the image capture unit and generates measurement data relating to the number of entering and exiting persons for each predetermined period, and transmits the measurement data for the each predetermined period to the server device connected to the image capture device via a network, and in which the server device receives the measurement data which is transmitted from the image capture device for the each predetermined period, accumulates the received measurement data for the each predetermined period in a storage unit, and statistically processes the measurement data for the each predetermined period to generate the statistical data for targeting one facility or for targeting a whole of a plurality of facilities.

According to the present disclosure, it is possible to collect measurement data of an image capture device with good timing using a server device, to efficiently generate statistical data relating to the number of entering and exiting persons using the server device, and to present the data to a user.

BRIEF DESCRIPTION OF DRAWINGS

FIG. 21 is an explanatory diagram illustrating a store-by-store annual report screen.

DESCRIPTION OF EMBODIMENT

Figure 1:
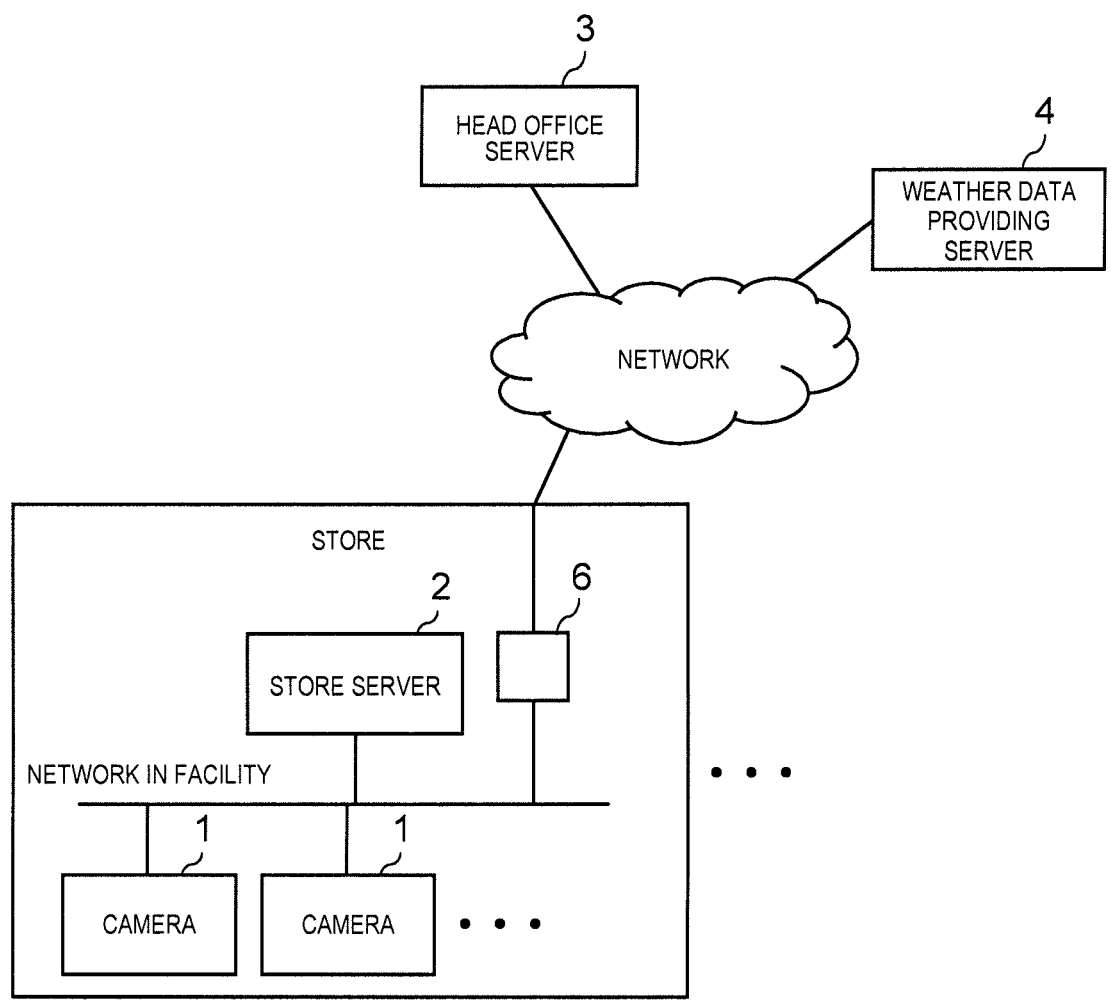
FIG. 1 is a whole configuration diagram of a facility operation assistance system according to the present exemplary embodiment.

A first invention made to solve the problem is a facility operation assistance system presenting statistical data relating to a situation of persons entering and exiting from doorways of one or more facilities to a user, includes one or more image capture devices that are arranged in the facility, and a server device which is connected to the image capture device via a network, in which the image capture device includes an image capture unit capturing an image of a periphery of the doorway of the facility, a processor detecting persons entering and exiting from the doorway based on captured images that are sequentially output from the image capture unit and generating measurement data relating to the number of entering and exiting persons for each predetermined period, and a communication unit transmitting the measurement data for the each predetermined period which is output from the processor to the server device, and in which the server device includes a communication unit receiving the measurement data for the each predetermined period which is transmitted from the image capture device, a storage unit accumulating the measurement data for the each predetermined period that is received by the communication unit, and a processor statistically processing the measurement data for the each predetermined period to generate the statistical data for targeting one facility or for targeting a whole of a plurality of facilities.

According to this, it is possible to collect measurement data of an image capture device with good timing using a server device, to efficiently generate statistical data relating to the number of entering and exiting persons using the server device, and to present the data to a user.

A second invention has a configuration in which the server device makes a transmission request of the measurement data to the image capture device for each predetermined period, and the image capture device transmits the measurement data for the each predetermined period to the server device in response to the transmission request.

According to this, since a server device controls transmission timing of measurement data from an image capture device, it is possible to avoid simultaneous transmission of the measurement data from the image capture device at the timing of acquiring the measurement data, and it is possible to smoothly transmit the measurement data from the image capture device to a server device. An address of the image capture device may be registered in the server device, and since it is unnecessary to register an address of a transmission destination server device to the image capture device one by one, it is possible to reduce a labor of setting relating to the image capture device in a case where there are many image capture devices.

A third invention is configured to include a first server device that is disposed in the facility and connected to the image capture device in the facility via a network, collects the measurement data from the image capture device, and generates the statistical data targeting the facility, and a second server device that is connected to the first server device via a network, collects the statistical data from the first server device, and generates the statistical data targeting the whole of the plurality of facilities.

According to this, a user on a facility side can browse statistical data targeting a facility that the user is in charge of in a first server device, and the user on a head office side supervising a plurality of stores can browse statistical data targeting a whole of a plurality of facilities in a second server device.

A fourth invention has a configuration in which the processor of the server device generates the statistical data including the number of entering and exiting persons for each of a plurality of doorways that are provided in one facility.

According to this, a user can grasp the number of entering and exiting persons for each of a plurality of doorway in a facility.

A fifth invention has a configuration in which the processor of the server device generates the statistical data including at least one of the number of staying persons at the facility and staying time, based on the number of entering and exiting persons.

According to this, a user can grasp the number of staying persons in the facility and staying time.

A sixth invention has a configuration in which the processor of the server device presents the statistical data which is statistically processed during a designated aggregation period based on an operation input of a user designating the aggregation period.

According to this, a user can browse statistical data statistically processed during a required aggregation period (for example, one day, one month, or one year).

A seventh invention has a configuration in which the processor of the server device presents the statistical data relating to a selected facility based on an operation input of a user selecting the facility.

According to this, a user can browse statistical data of a required facility.

An eighth invention is a facility image capture device that is disposed in a facility and is connected to a server device via a network, and is configured to include an image capture unit that captures an image of a periphery of a doorway of the facility, a processor that detects persons entering and exiting from the doorway based on captured images that are sequentially output from the image capture unit and generates measurement data relating to the number of entering and exiting persons for each predetermined period, and a communication unit that transmits the measurement data which is output from the processor for the each predetermined period to the server device, in which the processor transmits the measurement data for the each predetermined period to the server device in response to a transmission request which is transmitted from the server device for each predetermined period.

According to this, in the same manner as the first invention, it is possible to collect measurement data of an image capture device with good timing using a server device, to efficiently generate statistical data relating to the number of entering and exiting persons using the server device, and to present the data to a user.

A ninth invention is a facility operation assistance method of presenting statistical data relating to a situation of persons entering and exiting from doorways of one or more facilities to a user, and has a configuration in which one or more image capture devices arranged in the facilities captures images of a periphery of doorways of facilities using an image capture unit, detects persons entering and exiting from the doorways based on captured images that are sequentially output from the image capture unit and generates measurement data relating to the number of entering and exiting persons for each predetermined period, and transmits the measurement data for the each predetermined period to the server device connected to the image capture device via a network, and in which the server device receives the measurement data which is transmitted from the image capture device for the each predetermined period, accumulates the received measurement data for the each predetermined period in a storage unit, and statistically processes the measurement data for the each predetermined period to generate the statistical data for targeting one facility or the statistical data for targeting a whole of a plurality of facilities.

According to this, in the same manner as the first invention, it is possible to collect measurement data of an image capture device with good timing using a server device, to efficiently generate statistical data relating to the number of entering and exiting persons using the server device, and to present the data to a user.

Hereinafter, exemplary embodiments will be described with reference to the drawings.

FIG. 1 is a whole configuration diagram of a facility operation assistance system according to the present exemplary embodiment.

This facility operation assistance system provides a user with statistical data on a situation of entry and exit of a person at a doorway of a store (facility) and includes camera 1 (image capturing device) and store server 2 (first server device) installed in each store, head office server 3 (second server device) installed in a head office supervising a plurality of stores, and weather data providing server 4.

Camera 1 is installed to take an image of a doorway of the store, detects a person who enters or exits from the doorway in the captured image, and measures the number of entering and exiting persons at the doorway. Camera 1 can communicate with store server 2 via a network in the facility and provides store server 2 with measurement data of the number of entering and exiting persons.

Store server 2 collects the measurement data from camera 1 in the facility, performs statistical processing of the measurement data for each camera 1, generates statistical data for one store, and presents the statistical data to a store user (store manager or the like). Specifically, a browsing screen for presenting a situation (such as the number of entering and exiting persons and the number of staying persons) of persons entering and exiting from the store and staying in the store from the opening time to the current time in real time in one store is displayed, and a browsing screen for presenting a situation of persons entering and exiting from the store and persons of staying in the store for one day, one month, and one year in one store is displayed.

Store server 2 can communicate with weather data providing server 4 via router 6 and an external network such as the Internet. Weather data providing server 4 provides weather data (temperature, weather, and the like) of each place and store server 2 acquires the weather data of a region where a store is installed from weather data providing server 4.

Store server 2 can communicate with head office server 3 via router 6 and an external network such as the Internet and provides statistical data of the store acquired by store server 2 and the weather data acquired from weather data providing server 4 to head office server 3.

The head office server 3 collects statistical data for each store from store server 2, performs statistical processing of the statistical data for each store, generates statistical data for all of a plurality of stores, and presents the statistical data to a user (supervisor or the like) on the head office side. Specifically, a browsing screen for presenting a situation of persons entering and exiting from the store and staying in the store from the opening time to the current time in real time in a plurality of stores is displayed, and a browsing screen for presenting a situation of persons entering and exiting from the store and persons of staying in the store for one day, one month, and one year in the plurality of stores is displayed.

Figure 2:
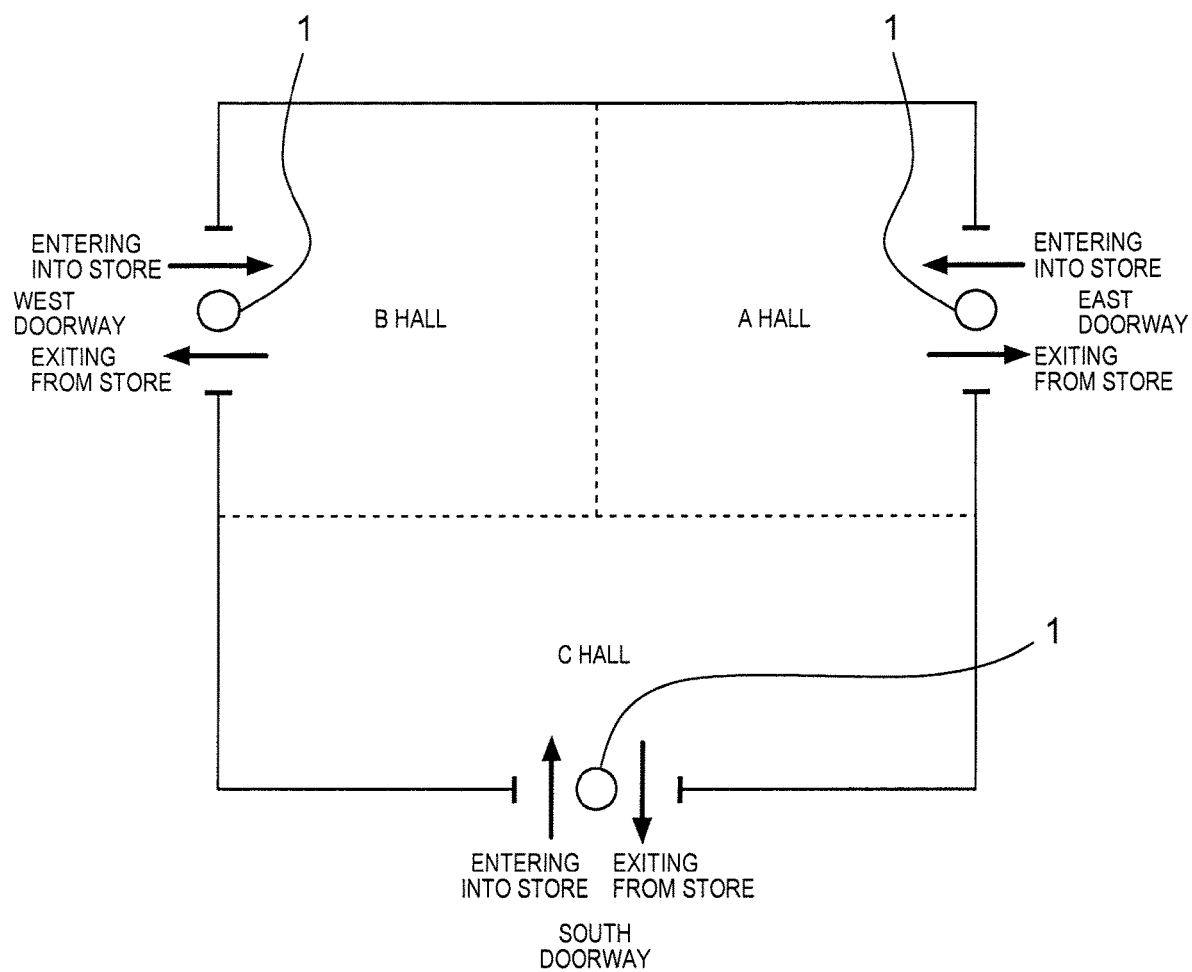
FIG. 2 is an explanatory diagram illustrating an example of a layout of a store and an arrangement situation of camera 1.

Next, a layout of a store and an arrangement situation of camera 1 will be described. FIG. 2 is an explanatory diagram illustrating an example of the layout of the store and the arrangement situation of camera 1.

The store is a large commercial facility such as a shopping mall and has a plurality of doorways. In the example illustrated in FIG. 2, the store is divided into A-hall, B-hall, and C-hall where a direct management shop, a specialty shop, a movie theater, and the like are installed, respectively, and three doorways such as an east door, a west doorway, and a south doorway are provided.

Camera 1 is an omnidirectional camera, which is installed at each doorway of the store and captures an image of a person who enters or exits from the doorway. Camera 1 detects persons who enter and exit from each doorway in the captured image and measures the number of entering and exiting persons at each doorway. Measurement data of the number of entering and exiting persons acquired by camera 1 is provided to store server 2, and store server 2 acquires the number of entering and exiting persons at each doorway (each hall) and the number of entering and exiting persons of the whole shopping mall.

Here, in the present exemplary embodiment, a measurement line is previously set at a position corresponding to the doorway on the captured image of camera 1. The persons are detected from the captured image, a movement trajectory (movement line) for each person is acquired, the entering and exiting persons are detected based on an intersection situation between the movement trajectory for each person and the measurement line, and the number of entering and exiting persons is counted. That is, in a case where the movement trajectory intersects the measurement line in an entrance direction, it is determined that the person enters the store, and in a case where the movement trajectory intersects the measurement line in an exit direction, it is determined that the person exits the store, and the number of entering persons and the number of exiting persons are counted.

In a wide doorway, there is a case where a plurality of cameras 1 capture images, and in this case, the number of persons entering and exiting from one doorway is obtained by adding up the numbers of entering and exiting persons measured by respective cameras 1. There is a case where a plurality of doorways are imaged by one camera 1, and in this case, a plurality of measurement lines corresponding to each doorway are set on the captured image, persons who pass through each measurement line are counted, and thereby, the number of persons entering and exiting each doorway is obtained.

Figure 3:
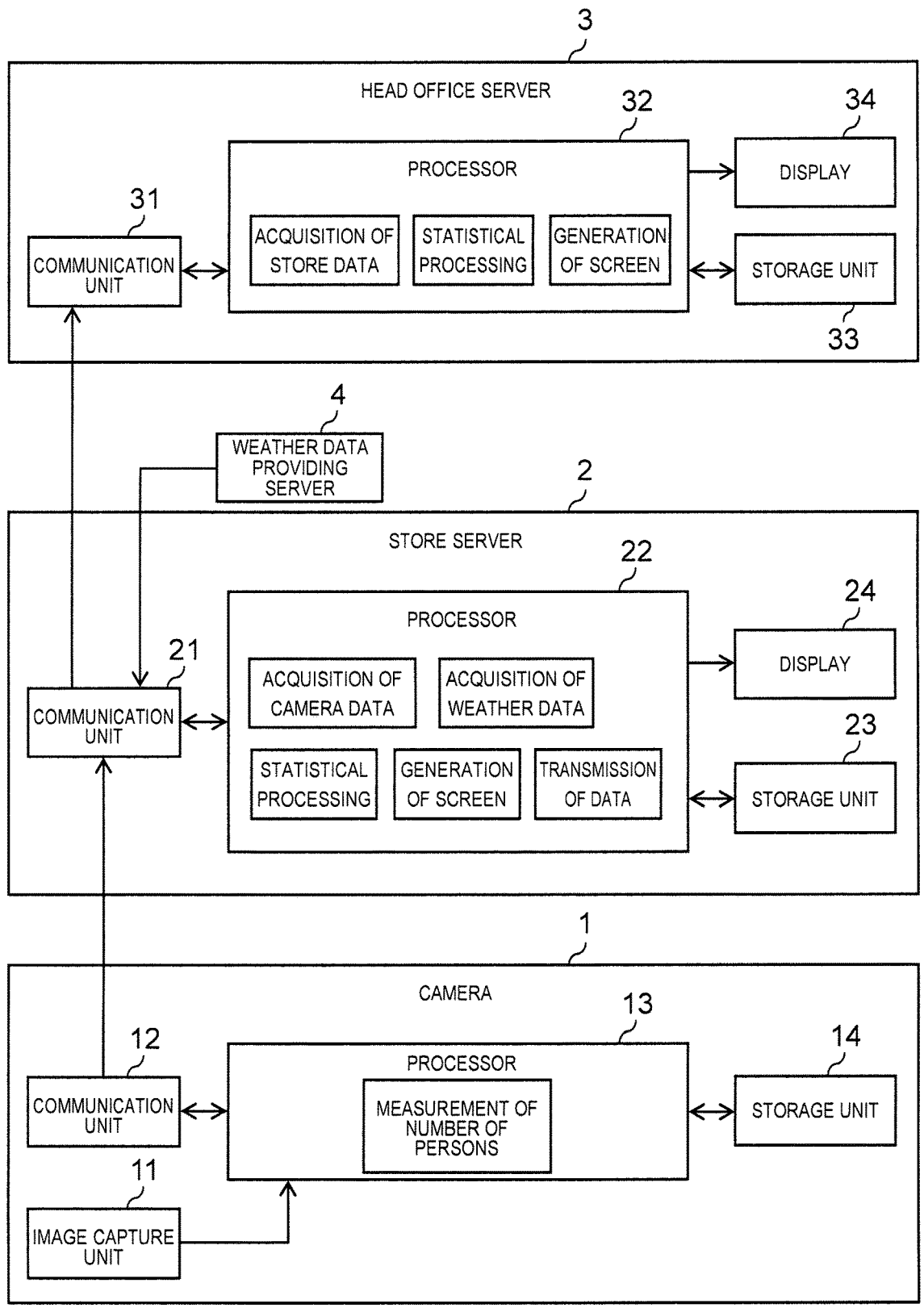
FIG. 3 is a block diagram illustrating a schematic configuration of camera 1, store server 2, and head office server 3.

Next, a schematic configuration of camera 1, store server 2 and head office server 3 will be described. FIG. 3 is a block diagram illustrating the schematic configuration of camera 1, store server 2, and head office server 3.

Camera 1 includes image capture unit 11, communication unit 12, processor 13, and storage unit 14.

Image capture unit 11 images a periphery of the doorway of the store, and sequentially outputs captured images (frames) that are temporally consecutive.

Storage unit 14 stores the captured images output from image capture unit 11 and measurement data generated by processor 13. Storage unit 14 stores a program to be executed by processor 13.

Processor 13 performs various types of processing by executing the program stored in storage unit 14. In the present exemplary embodiment, persons entering and exiting from the doorway are detected from the captured images sequentially output from image capture unit 11, and measurement data relating to the number of entering and exiting persons per unit period (for example, 15 minutes) is generated (measurement of number of persons). The unit period may be set to an appropriate time such as 5 minutes or 30 minutes in addition to 15 minutes.

Communication unit 12 communicates with store server 2 via a network in a facility. In the present exemplary embodiment, the measurement data generated by processor 13 is transmitted to store server 2.

Store server 2 includes communication unit 21, processor 22, storage unit 23, and display 24 (display device).

Communication unit 21 communicates with camera 1 via the network in the facility. In the present exemplary embodiment, measurement data periodically transmitted from camera 1 is received. Communication unit 21 communicates with weather data providing server 4 via an external network. In the present exemplary embodiment, weather data transmitted from weather data providing server 4 is received. Communication unit 21 communicates with head office server 3 via an external network. In the present exemplary embodiment, statistical data generated by processor 22 and weather data acquired from weather data providing server 4 are transmitted to head office server 3.

Storage unit 23 stores the measurement data, which is received by communication unit 21, for each camera 1, the weather data received by communication unit 21, and the statistical data generated by processor 22. Storage unit 23 stores a program to be executed by processor 22.

Storage unit 23 stores various kinds of setting information necessary for statistical processing performed by processor 22. The setting information relates to opening and closing times, a statistical item to be displayed on a browsing screen of display 24, an interval of the time zone for displaying the statistical data for each time zone and the like on the browsing screen. The pieces of information are set by designation of a user on a setting screen.

Processor 22 performs various types of processing by executing the program stored in storage unit 23. In the present exemplary embodiment, measurement data for each camera 1 received by communication unit 21 is acquired (acquisition of camera data), the weather data on the current day (weather, temperature, sunshine time) received by communication unit 21 is acquired (acquisition of weather data), and statistical processing is performed according to aggregation conditions such as an aggregation period and a statistical item designated by a user with respect to the measurement data and the weather data for each camera 1. In the statistical processing, first, measurement data (the number of entering and exiting persons) for each unit period (for example, 15 minutes) of each camera 1 from the opening time to the current time is aggregated, and dashboard data which is statistical data of designated time is generated.

Processor 22 generates measurement data for one day, that is, daily report data which is statistical data for one day by statistical processing for aggregating measurement data (number of entering and exiting persons) for each unit period of each camera 1 (daily aggregation). Statistical values for one month are calculated by the statistical processing of the measurement data for one month and the daily report data, and monthly report data, which is statistical data for one month, is generated (monthly aggregation). Statistical values for one year are calculated by the statistical processing of the measurement data, the daily report data, and the monthly report data for one year, and annual report data which is statistical data for one year is generated (annual aggregation).

Here, in the present exemplary embodiment, the total number of entering persons and the total number of exiting persons are obtained by respectively adding up the number of entering persons and the number of exiting persons for each unit period at all doorways during a target period, as the statistical items of the total number of entering and exiting persons. The number of entering persons for each doorway and the number of exiting persons for each doorway are obtained by respectively adding up the number of entering persons and the number of exiting persons for each unit period at each doorway during the target period, as the statistical items of the number of entering and exiting persons for each doorway.

The maximum number of staying persons which is the maximum value of the number of staying persons (the number of persons staying in the store) at each time (time corresponding to unit time)during the target period, and the average number of staying persons which is an average value of the number of staying persons at each time are obtained. The number of staying persons at each time can be estimated by accumulating differences between the total number of entering persons and the total number of exiting persons per unit time from the opening time.

The average staying time which is an average value of staying time of a person staying in the store, and the maximum staying time which is the maximum value of the staying time of the person staying in the store are obtained, as statistical items of the staying time. The average staying time and the maximum staying time can be estimated from the number of staying persons at each time. The maximum staying time which is the time when the number of staying persons during the target period is the largest may be obtained, as a statistical item of the staying time.

The target period becomes a period from the opening time to the designated time (current time in real time) in dashboard data, and becomes a day, that is, a period from the opening time to the closing time in the daily report data, the monthly report data, and the annual report data.

Processor 22 transmits (data transmission) the measurement data acquired from camera 1 and the weather data acquired from weather data providing server 4 to head office server 3 at a predetermined interval (15 minutes). The daily report data generated by the statistical processing (daily aggregation) every day is transmitted (data transmission) to head office server 3. The monthly report data generated by statistical processing (monthly aggregation) every month is transmitted (data transmission) to head office server 3. Annual report data generated by the statistical processing (annual aggregation) every year is transmitted (data transmission) to head office server 3.

Processor 22 generates (screen generation) a screen to be displayed on display 24. In the present exemplary embodiment, a dashboard screen (see FIGS. 7 and 8), a daily report screen (see FIGS. 9 to 11), a monthly report screen (see FIG. 12), and an annual report screen (see FIG. 13) are generated based on the dashboard data, the daily report data, the monthly report data, and the annual report data which are generated by the statistical processing performed by processor 22.

Head office server 3 includes communication unit 31, processor 32, storage unit 33, and display 34 (display device).

Communication unit 31 communicates with store server 2. In the present exemplary embodiment, measurement data and statistical data for each store periodically transmitted from store server 2 of each store at a predetermined interval (for example, 15 minutes) are received.

Storage unit 33 stores the measurement data and the statistical data for each store received by communication unit 31, and the statistical data generated by processor 32. Storage unit 33 stores a program to be executed by processor 32.

Storage unit 33 stores various kinds of setting information necessary for the statistical processing performed by processor 32. The setting information is statistical items to be displayed on the browsing screen of display 24, an interval of time zone in a case where the statistical data for each time zone is displayed on the browsing screen, the stores for each region to be displayed on the browsing screen of display 24, and the like. The information is set by designation of a user on the setting screen.

Processor 32 performs various types of processing by executing the program stored in storage unit 33. In the present exemplary embodiment, the measurement data and statistical data for each store received by communication unit 31 is acquired (acquirement of store data), and the statistical processing is performed according to aggregation conditions of such as an aggregation period and a statistical item designated by a user with respect to the measurement data and the statistical data for each store. In the statistical processing, total daily report data, total monthly report data, and total annual report data are generated by performing a daily aggregation, a monthly aggregation, and an annual aggregation for the statistical data of all the stores.

Processor 32 generates a screen to be displayed on display 34 (generation of screen). In the present exemplary embodiment, a whole daily report screen (see FIG. 15), a whole monthly report screen (see FIG. 16), and a whole year report screen (see FIG. 17) are generated based on the statistical data (total daily report data, total monthly report data, and total annual report data) generated by the statistical processing to be performed by processor 32. A store-by-store dashboard screen (see FIG. 18), a store-by-store daily report screen (see FIG. 19), a store-by-store monthly report screen (see FIG. 20), and a store-by-store annual report screen (see FIG. 21) are generated based on the statistical data (dashboard data, daily report data, monthly report data, and annual report data) acquired from store server 2.

Figure 4:
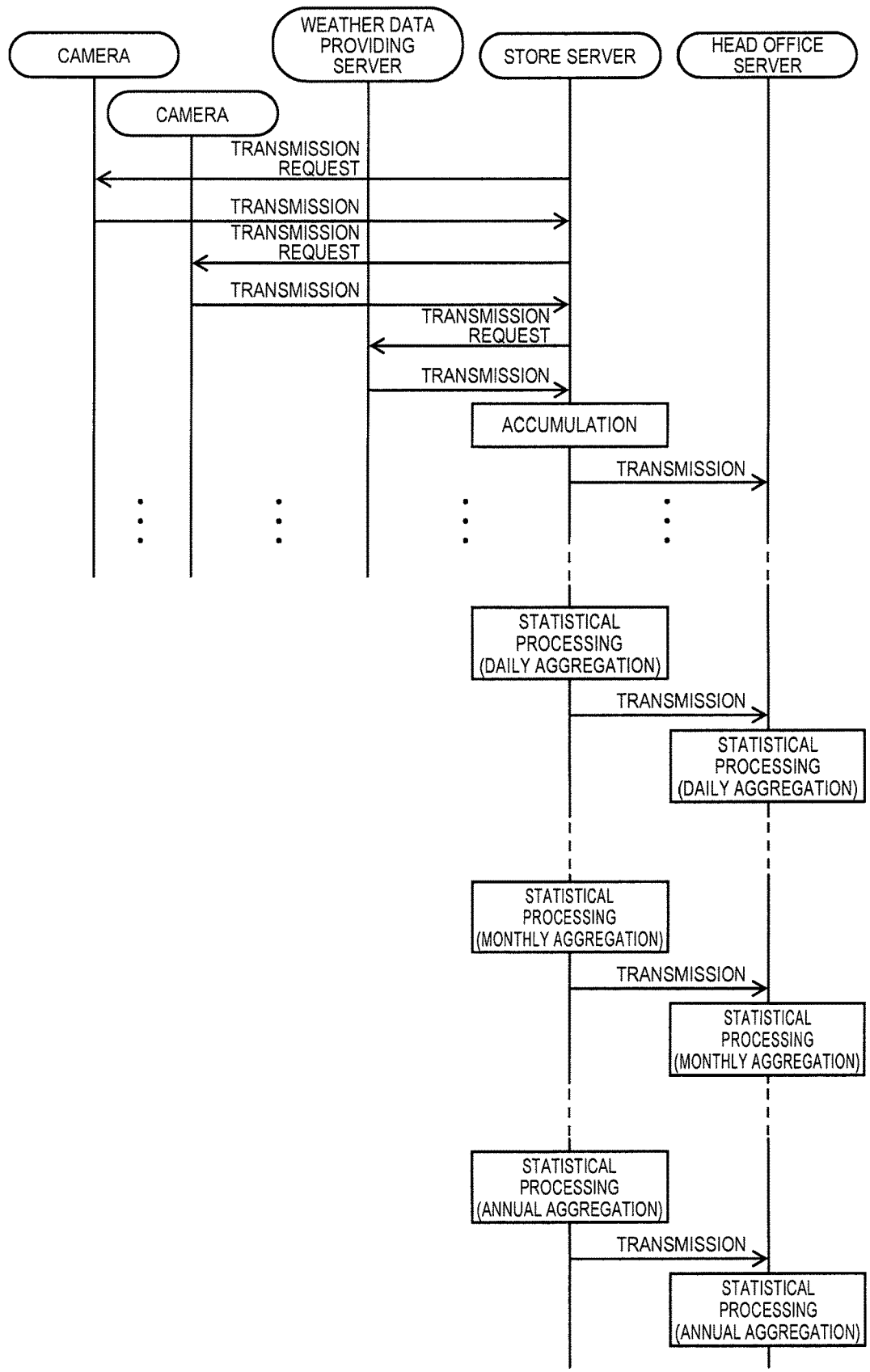
FIG. 4 is a sequence diagram illustrating an operation sequence of camera 1, store server 2, and head office server 3.

Next, an operation sequence of camera 1, store server 2, and head office server 3 will be described. FIG. 4 is a sequence diagram illustrating the operation sequence of camera 1, store server 2, and head office server 3.

Store server 2 periodically transmits a transmission request to camera 1 at a predetermined interval (for example, 15 minutes), and camera 1 transmits the measurement data in response to the transmission request from store server 2. The transmission request is transmitted to weather data providing server 4 at a predetermined interval (for example, one hour), and weather data providing server 4 transmits the weather data in response to the transmission request from store server 2.

Store server 2 accumulates measurement data acquired from camera 1 and the weather data acquired from weather data providing server 4 in storage unit 23. Store server 2 spontaneously transmits the measurement data and the weather data to head office server 3.

A data acquisition interval (transmission interval) can be designated by a user and is stored in storage unit 23 as the setting information. This data acquisition interval is the same as the interval (unit period) for generating the measurement data of the number of entering and exiting persons using camera 1.

As described above, in the present exemplary embodiment, since store server 2 controls transmission timing of the measurement data from camera 1, it is possible to avoid simultaneous transmission of the measurement data from camera 1 at the timing when the measurement data is acquired, and to smoothly transmit the measurement data from camera 1 to store server 2. Since an address of camera 1 may be registered in store server 2 and an address of store server 2 of a transmission destination need not be registered to camera 1 one by one, time and labor required for setting relating to camera 1 can be reduced in a case where there are many cameras 1.

At the timing when the measurement data for one day are collected, store server 2 performs the daily aggregation for aggregating the measurement data for one day once a day. The generated daily report data is transmitted to head office server 3. At the timing when the measurement data for one month and the daily report data are collected, monthly aggregation for aggregating the data for one month is performed once a month. The generated monthly report data is transmitted to head office server 3. At the timing when the measurement data, the daily report data, and the monthly report data for one year are collected once a year, annual aggregation for aggregating the data for one year is performed. The generated annual report data is transmitted to head office server 3.

Head office server 3 performs daily aggregation once a day using the data acquired from store server 2, in the same manner as store server 2, performs monthly aggregation once a month, and performs annual aggregation once a year.

Figure 5:
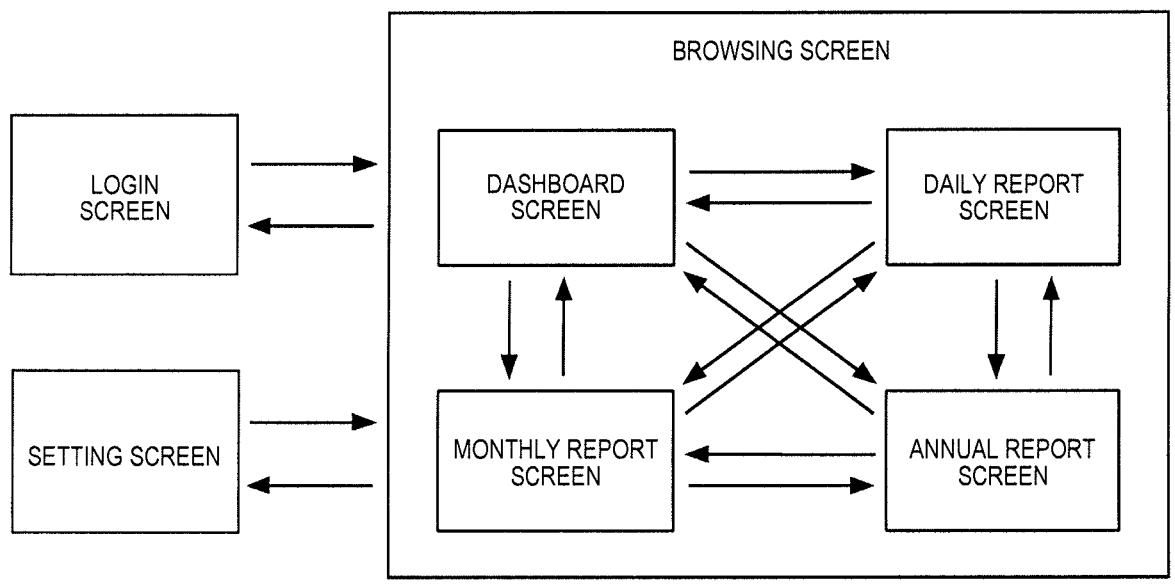
FIG. 5 is an explanatory diagram illustrating a transition state of a screen displayed in store server 2.
Figure 6:
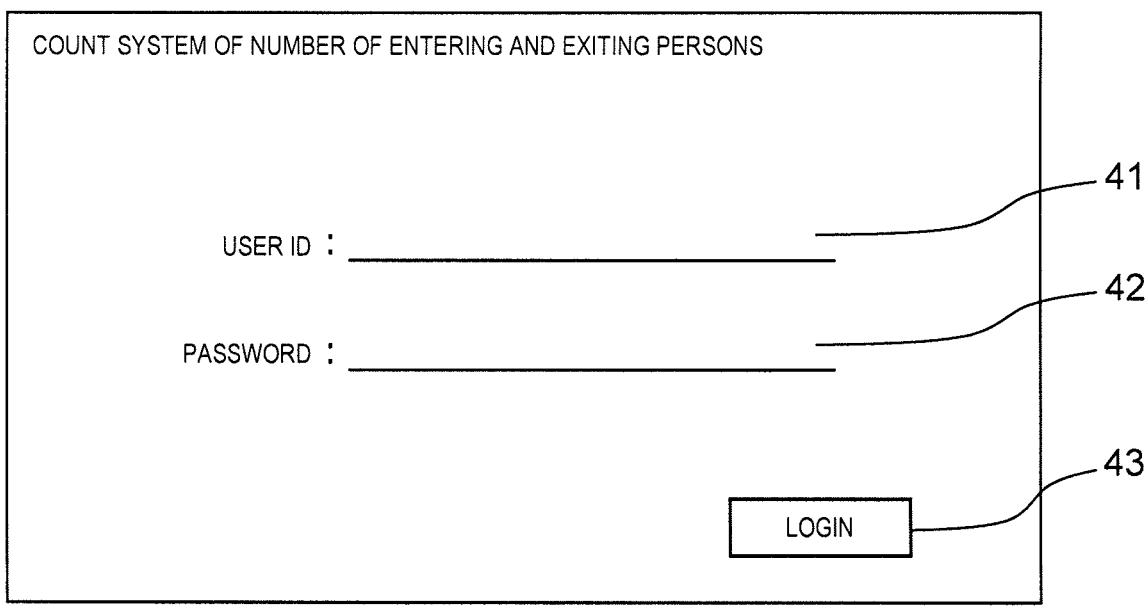
FIG. 6 is an explanatory diagram illustrating a login screen.
Figure 7:
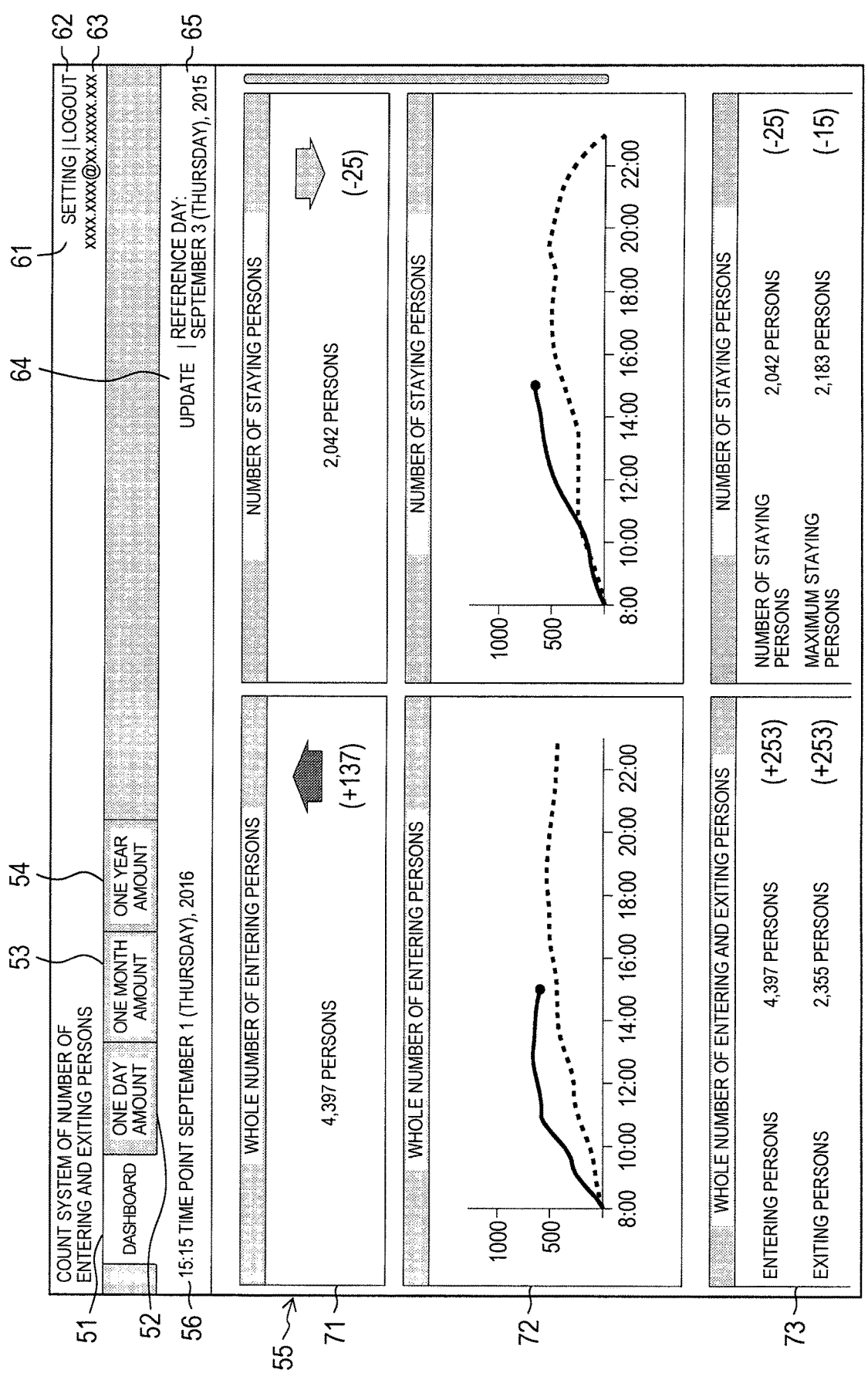
FIG. 7 is an explanatory diagram illustrating a dashboard screen.
Figure 8:
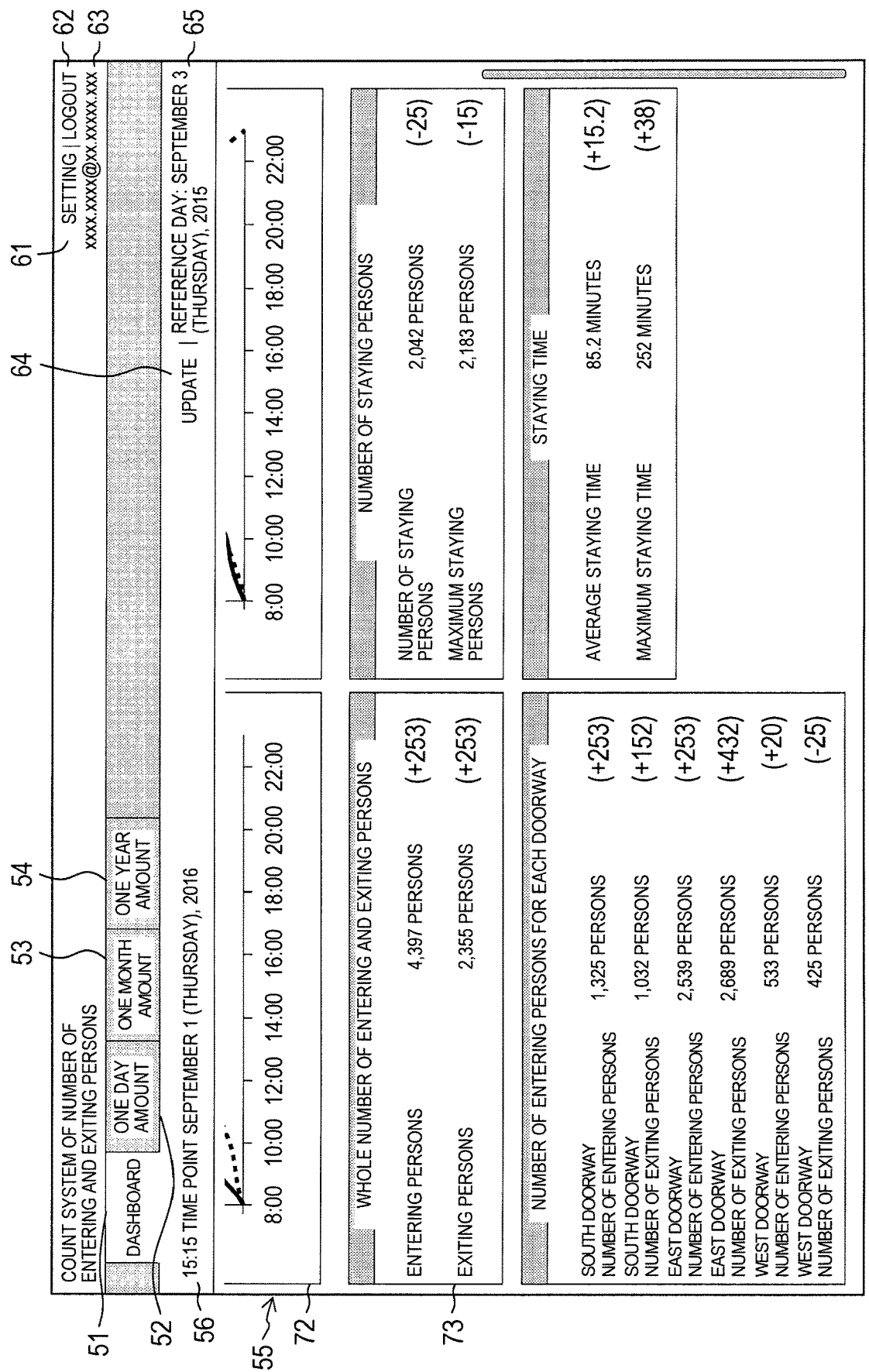
FIG. 8 is an explanatory diagram illustrating the dashboard screen.
Figure 9:
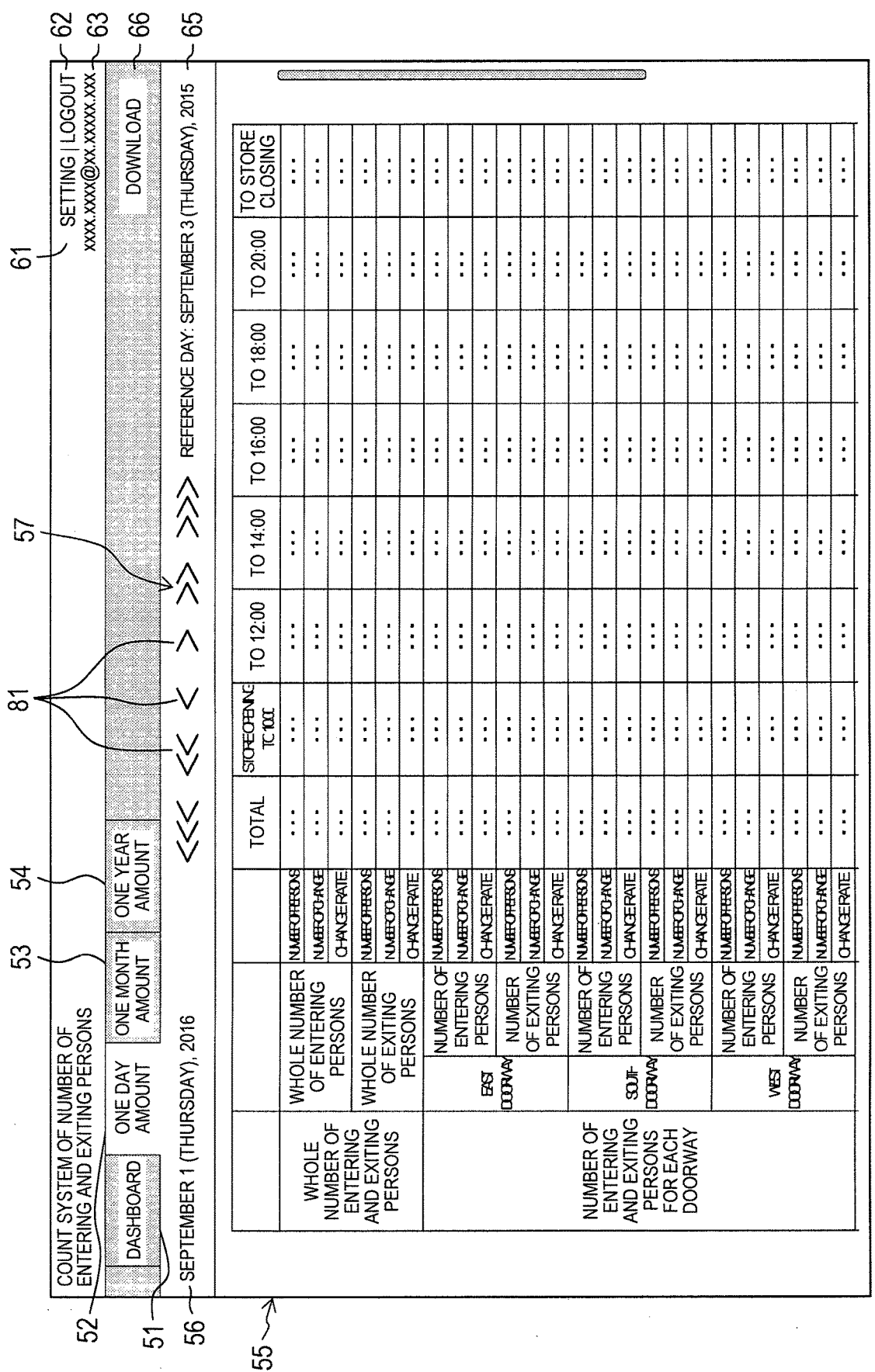
FIG. 9 is an explanatory diagram illustrating a daily report screen.
Figure 10:
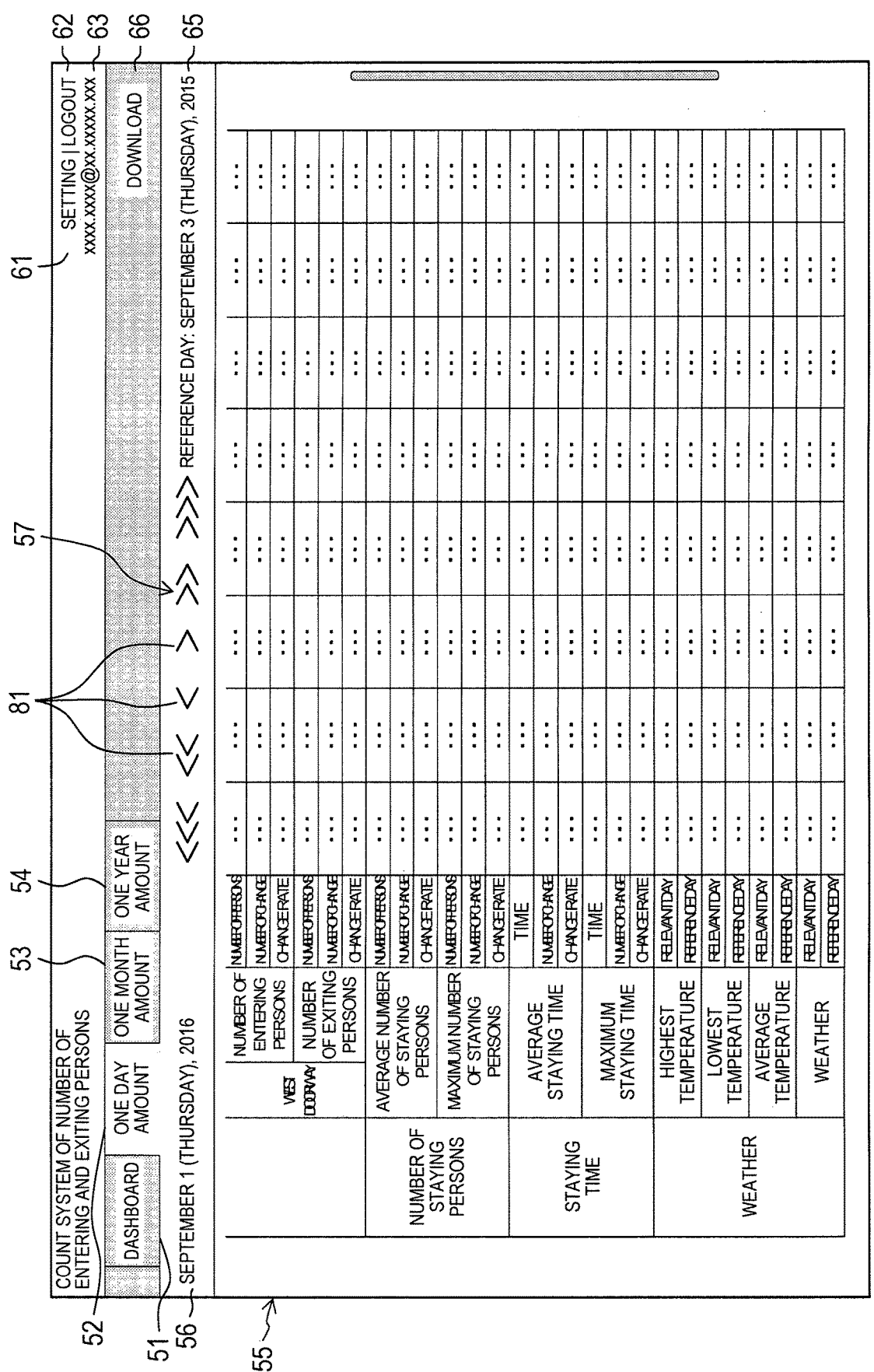
FIG. 10 is an explanatory diagram illustrating the daily report screen.
Figure 11:
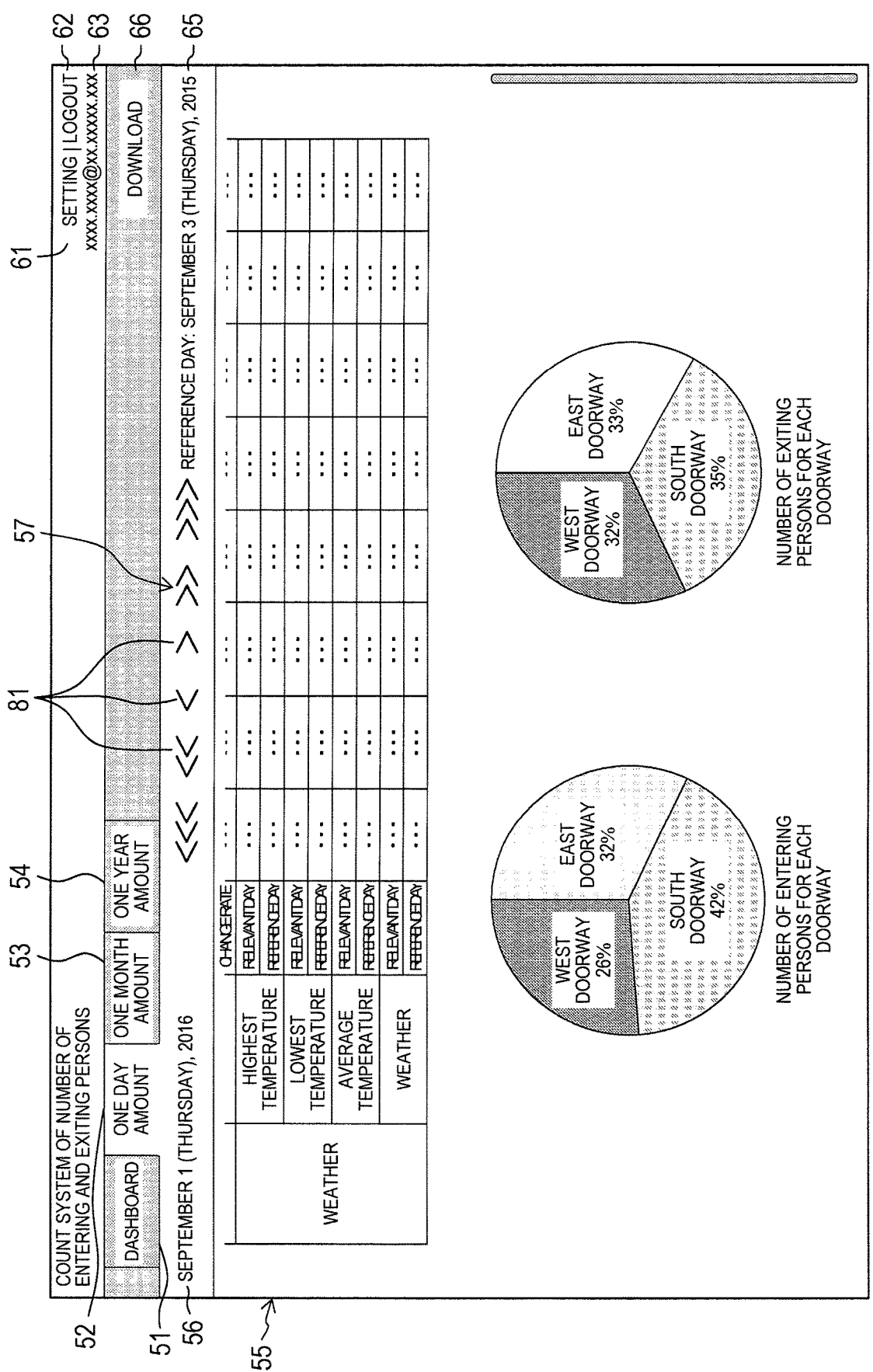
FIG. 11 is an explanatory diagram illustrating the daily report screen.
Figure 12:
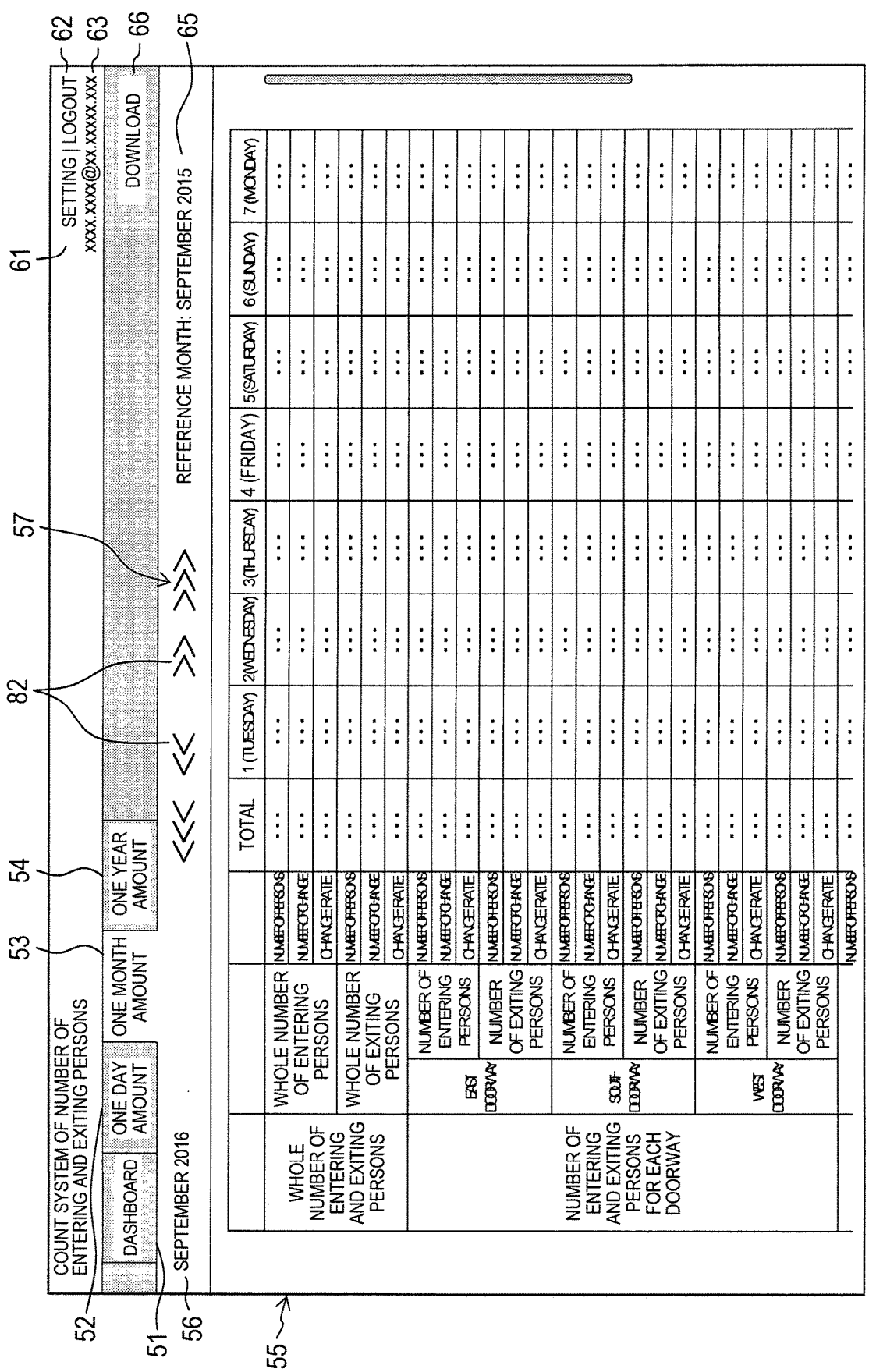
FIG. 12 is an explanatory diagram illustrating a monthly report screen.
Figure 13:
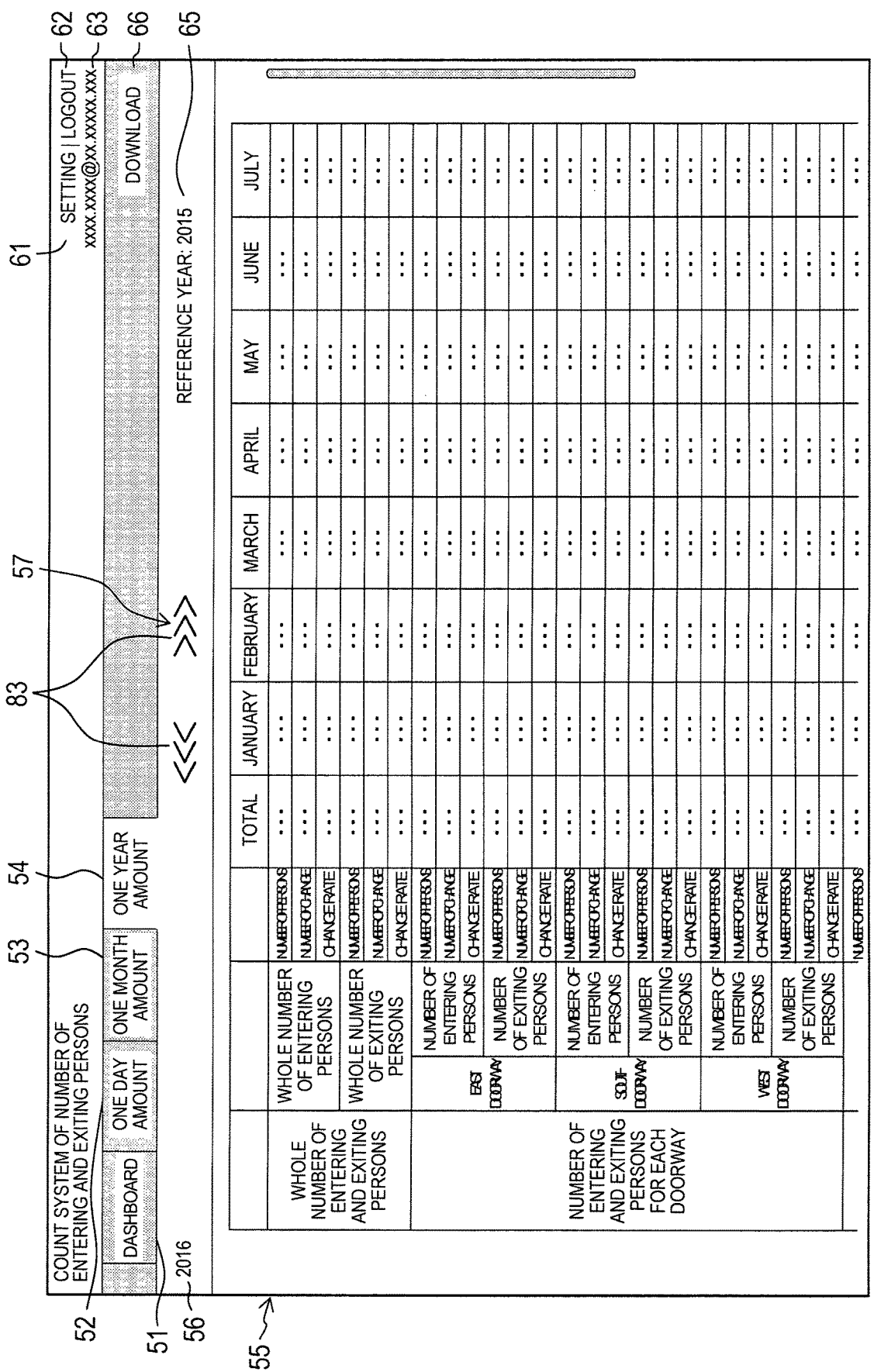
FIG. 13 is an explanatory diagram illustrating an annual report screen.

Next, a screen displayed on store server 2 will be described. FIG. 5 is an explanatory diagram illustrating a transition situation of a screen displayed on store server 2. FIG. 6 is an explanatory diagram illustrating a login screen. FIGS. 7 and 8 are explanatory diagrams illustrating a dashboard screen. FIG. 9, FIG. 10, and FIG. 11 are explanatory diagrams illustrating a daily report screen. FIG. 12 is an explanatory diagram illustrating a monthly report screen. FIG. 13 is an explanatory diagram illustrating an annual report screen.

As illustrated in FIG. 5, if store server 2 starts a person number measurement application, the login screen is first displayed. As illustrated in FIG. 6, the login screen is provided with user ID input section 41 and password input section 42. When a user inputs a user ID and a password to input sections 41 and 42 and operates "login" button 43, a user authentication is performed with the input contents. If the user authentication is successful with the contents input by the user on the login screen, the screen is changed to a browsing screen.

As illustrated in FIG. 5, a dashboard screen (see FIGS. 7 and 8), a daily report screen (see FIGS. 9 to 11), a monthly report screen (see FIG. 12), and an annual report screen (see FIG. 13) are displayed on the browsing screen.

As illustrated in FIG. 7, FIG. 9, FIG. 12, and FIG. 13, tab 51 of a "dashboard", tab 52 of "amount of one day", tab 53 of "amount of one month", and tab 54 of "amount of one year" are provided on each browsing screen, and the browsing screen can be switched by operating these tabs 51 to 54. That is, if tab 51 of the "dashboard" is operated, the screen changes to the dashboard screen, and if tab 53 of "amount of one day" is operated, the screen changes to the daily report screen, if tab 53 of "amount of one month" is operated, the screen changes to the monthly report screen, if tab 54 of "amount of one year" is operated, the screen changes to the annual report screen. An initial screen initially displayed when the login is performed is the dashboard screen.

Statistical data display section 55 is provided on each browsing screen, and the statistical data generated by processor 22 of store server 2 is displayed in statistical data display section 55.

Aggregation period display section 56 is provided on each browsing screen, and an aggregation period of statistical data displayed in statistical data display section 55 is displayed in aggregation period display section 56. The aggregation period is changed on each browsing screen. That is, in the dashboard screen (see FIG. 7), the aggregation period is a period from the opening time of the day to the designated time (current time in real time), and the designated time is displayed in aggregation period display section 56. In the daily report screen (see FIG. 9), the aggregation period is a day, and in the monthly report screen (see FIG. 12), the aggregation period is a month, and in the annual report screen (see FIG. 13), the aggregation period is a year, and the day, the month, and the year are displayed in aggregation period display section 56.

If aggregation period display section 56 is operated, an aggregation period selection screen (not illustrated) is popped up. On the aggregation period selection screen, a calendar for selecting a date, a button for selecting time, and the like are provided, and the aggregation period can be changed by performing a necessary operation on the aggregation period selection screen.

Button 61 of "setting" is provided on each browsing screen, and if button 61 is operated, the screen is changed to a setting screen (not illustrated). On the setting screen, a user can designate a statistical item and the like to be displayed on each browsing screen.

Button 62 of "logout" is provided on each browsing screen, and if button 62 is operated, logout is performed and the screen returns to the login screen (see FIG. 6).

Logging-in user display section 63 is provided on each browsing screen, and information (user ID) of a currently logged-in user is displayed in logging-in user display section 63.

Button 64 of "update" is provided on the dashboard screen, and if button 64 is operated, the aggregation period is set to a period corresponding to the current date and time, and the statistical data displayed on the dashboard screen is updated to the latest data. That is, the aggregation period becomes a period from the opening time of the day to the current time, and the statistical data of the period from the opening time of the day to the current time is displayed.

Reference period display section 65 is provided on each browsing screen. In addition to the statistical value of the aggregation period, the amount of change (the amount of increase and decrease and a change rate) of the statistical value of a reference period (reference aggregation period) with respect to the statistical value of the aggregation period is displayed on each browsing screen, and reference period display section 65 displays a date, a month, or a year designated as the reference period. That is, on the dashboard screen and the daily report screen, a reference date is designated as the reference period, for example, the same day closest to the same month of the previous year. On the monthly report screen, a reference month, for example, the same month of the previous year is designated as the reference period. On the annual report screen, a reference year, for example, the previous year is designated as the reference period.

If reference period display section 65 is operated, a reference period setting screen (not illustrated) is displayed, and the user can designate the reference period (the reference date, the reference month, and the reference year).

Button 66 of "download" is provided on each browsing screen (the daily report screen (see FIG. 9), the monthly report screen (see FIG. 12), and the annual report screen (see FIG. 13)) except for the dashboard screen. If button 66 is operated, a data file relating to the browsing screen currently being displayed is downloaded. Thereby, the user can perform edition such as creation of a graph. If button 66 of "download" is operated, a screen for displaying a list of downloadable files is displayed and the user may be able to select the file on the screen.

Aggregation period switching section 57 is provided on each browsing screen (daily report screen (see FIG. 9), monthly report screen (see FIG. 12), and annual report screen (see FIG. 13)) except for the dashboard screen. Aggregation period switching section 57 is for changing the aggregation period and is changed for each browsing screen.

That is, in the daily report screen illustrated in FIG. 9, six aggregation date switching buttons 81 are provided in aggregation period switching section 57, and by operating aggregation date switching buttons 81, the aggregation date (aggregation period) can be changed to the year before (latest same day of the previous year), the month before (latest same day of the previous month), the day before (the previous day), the day after (next day), the month after (latest same day of the next month), the year after (latest same day of the next year). In the monthly report screen illustrated in FIG. 12, four aggregation month switching buttons 82 are provided in aggregation period switching section 57, and by operating each of the aggregation month switching buttons 82, an aggregation month (aggregation period) can be changed to the year before (the same month of the previous year), the month before (previous month), the month after (the next month), the year after (the same month of the next year). In the annual report screen illustrated in FIG. 13, two aggregation year switching buttons 83 are provided in aggregation period switching section 57, and by operating the aggregation year switching buttons 83, the aggregation year (aggregation period) can be changed to the year before (the previous year) and the year after (the next year).

Instead of aggregation period switching section 57, a button for popping up the aggregation period setting screen (not illustrated) is provided, and the user may be able to select the aggregation period on the aggregation period setting screen. If the aggregation period is changed in aggregation period switching section 57, the reference period may be automatically changed such that an interval between the aggregation period and the reference period is kept constant.

As illustrated in FIGS. 7 and 8, in the dashboard screen, statistical data display section 55 is provided with enlarged display section 71, graph display section 72, and detailed display section 73. Statistical data of previously designated statistical items is displayed in enlarged display section 71, graph display section 72 and detailed display section 73. The statistical data is displayed on the dashboard screen in real time. That is, the statistical data obtained by aggregating the measurement data for each unit time (for example, 15 minutes) from the opening time of the current day to the current time is displayed and is updated to the latest statistical data with the lapse of time.

Presence or absence and order of displays of enlarged display section 71, graph display section 72, and detailed display section 73, and statistical items to be displayed in enlarged display section 71, graph display section 72, and detailed display section 73 and order of the display can be designated by the user, and are stored in storage unit 23 as setting information.

As will be described below, in addition to the statistical values of the aggregation period, the amount of change (the number of increase and decrease) of the statistical values of the reference period with respect to the statistical values of the aggregation period is displayed on the dashboard screen. Here, the statistical values of the aggregation period are obtained by aggregating the measurement data for each unit time on the current day during a period from the opening time to the display time, and the amount of change of the aggregation period with respect to the reference period is a difference between the statistical value of the aggregation period and the statistical value of the reference period at the same time as the statistical value of the aggregation period.

A statistical value of a previously designated statistical item during the aggregation period is displayed in enlarged display unit 71 as a large size character. In the example illustrated in FIG. 7, the statistical values of the respective statistical items of the total number of entering persons and the number of staying persons are displayed. Icons (an upward arrow and a downward arrow) representing an increase and decrease situation of the aggregation period with respect to the reference period, and a numerical value representing the amount of change (the number of increase and decrease) of the aggregation period with respect to the reference period are displayed in enlarged display section 71. In a case where the amount of change of the aggregation period with respect to the reference period is 0, the icon and the numerical value are not displayed.

In graph display section 72, a graph representing a transition situation of the statistical value of the previously designated statistical item is displayed. In graph display section 72, measurement data for each unit time (for example, 15 minutes) acquired from camera 1 is displayed as a line graph. Two graphs of an aggregation period and a reference period are displayed. In the example illustrated in FIG. 7, graphs of the respective statistical items of the total number of entering persons and the number of staying persons are displayed. The graph of the aggregation period is displayed by a solid line, and the graph of the reference period is displayed by a dotted line. In the graph of the aggregation period, a period from the opening time to the designated time (current time in real time) is displayed.

Statistical values of the previously designated statistical items are displayed in detailed display section 73. In the example illustrated in FIG. 8, it is designated to display the respective statistical items of the total number of entering and exiting persons, the number of staying persons, the number of entering and exiting persons for each doorway, and the staying time, and the statistical values of the respective statistical items and the amount of change (the number of increase and decrease) of the aggregation period with respect to the reference period are displayed.

As illustrated in FIGS. 9 and 10, on the daily report screen, a list representing the statistical values for each time zone of the respective designated statistical items during the designated one day (aggregation period) is displayed in statistical data display section 55. In the examples illustrated in FIGS. 9 and 10, the statistical values of the respective statistical items of the total number of entering and exiting persons, the number of entering and exiting persons for each doorway, the number of staying persons, the staying time, and the weather are displayed. The number of persons, and the number of change and a change rate with respect to the reference date are displayed in the statistical item of the total number of entering and exiting persons, the number of entering and exiting persons for each doorway, and the number of staying persons. Time, and the number of change and the change rate with respect to the reference date are displayed in the statistical item of the staying time. Weather and temperature (highest temperature, lowest temperature, and average temperature) are displayed in the statistics item of weather.

As illustrated in FIG. 11, graphs are displayed in statistical data display section 55. In the example illustrated in FIG. 11, the number of entering persons for each doorway and the number of exiting persons for each doorway are displayed as a pie graph.

As illustrated in FIG. 12, on the monthly report screen, a list representing the statistical values for each day of the respective designated statistical item during the designated one month (summary period) is displayed in statistical data display section 55.

As illustrated in FIG. 13, on the annual report screen, a list representing the statistical values for each month of the respective designated statistical items during the designated one year (aggregation period) is displayed in statistical data display section 55.

On the monthly report screen (see FIG. 12) and the annual report screen (see FIG. 13), the statistical data of the respective statistical items such as the number of staying persons, the staying time, and the weather is displayed in the same manner as the daily report screen (see FIGS. 9 to 11). In the monthly report screen and the annual report screen, it is possible to display a graph in the same manner as in the daily report screen. A user can select whether or not to display the graph.

In the daily report screen, the monthly report screen, and the annual report screen, the statistical values of the respective statistical items displayed in the list are divided into a plurality of levels (for example, divided into groups for each 20% from the top) and color of a cell may be changed every level. In this case, a user may be able to select whether or not to color the cell.

Figure 14:
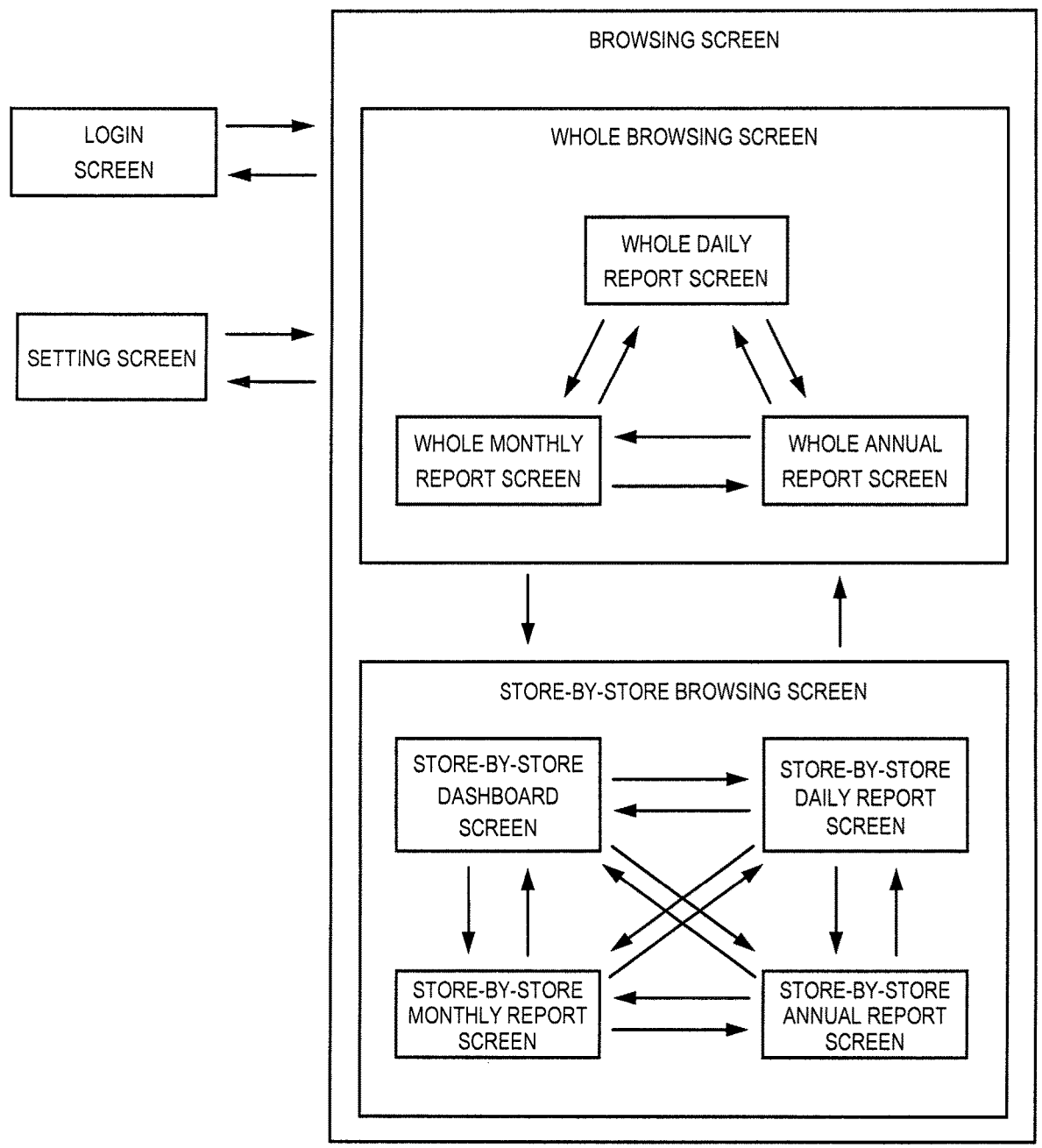
FIG. 14 is an explanatory diagram illustrating a transition state of a screen displayed in head office server 3.
Figure 15:
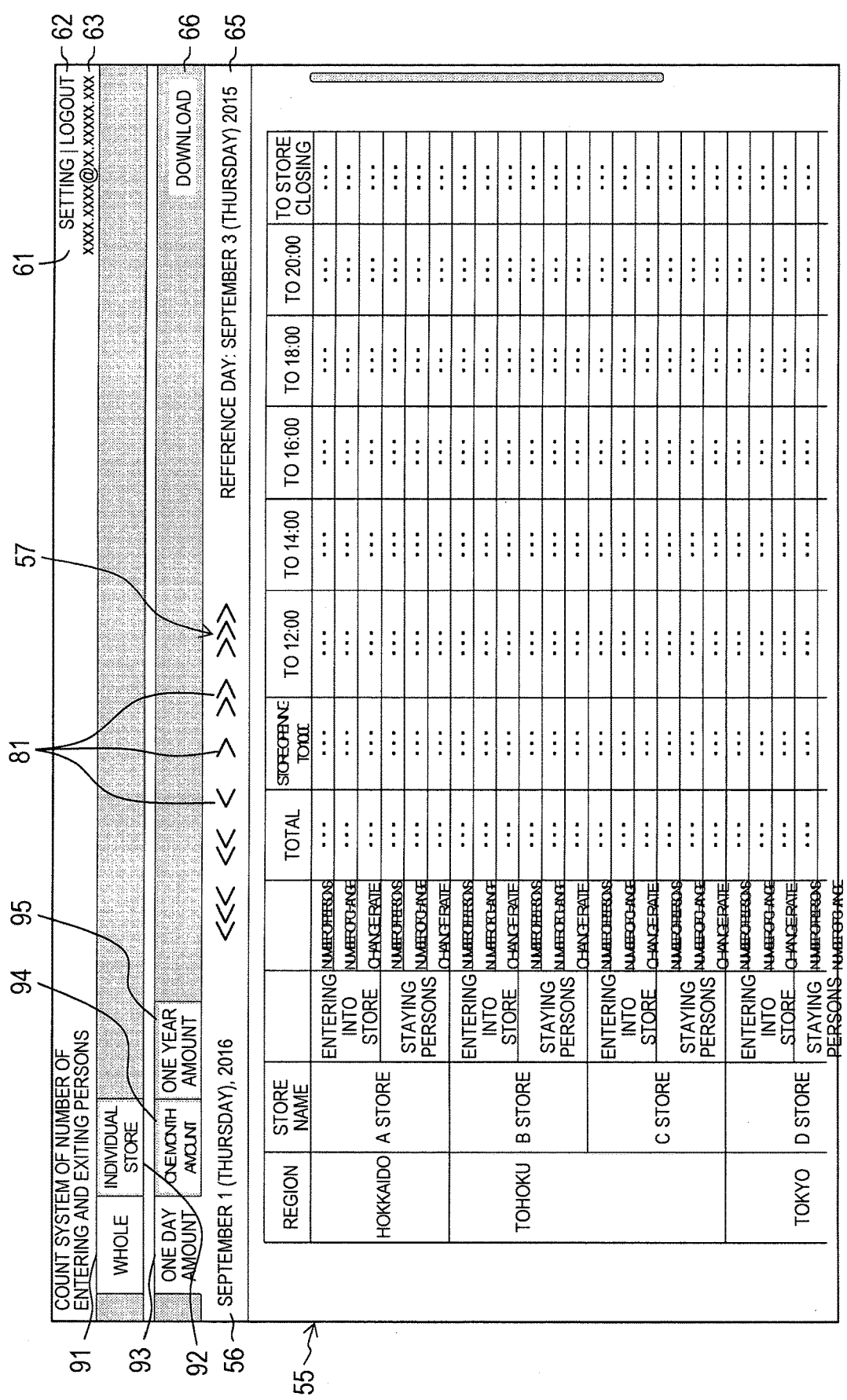
FIG. 15 is an explanatory diagram illustrating a whole daily report screen.
Figure 16:
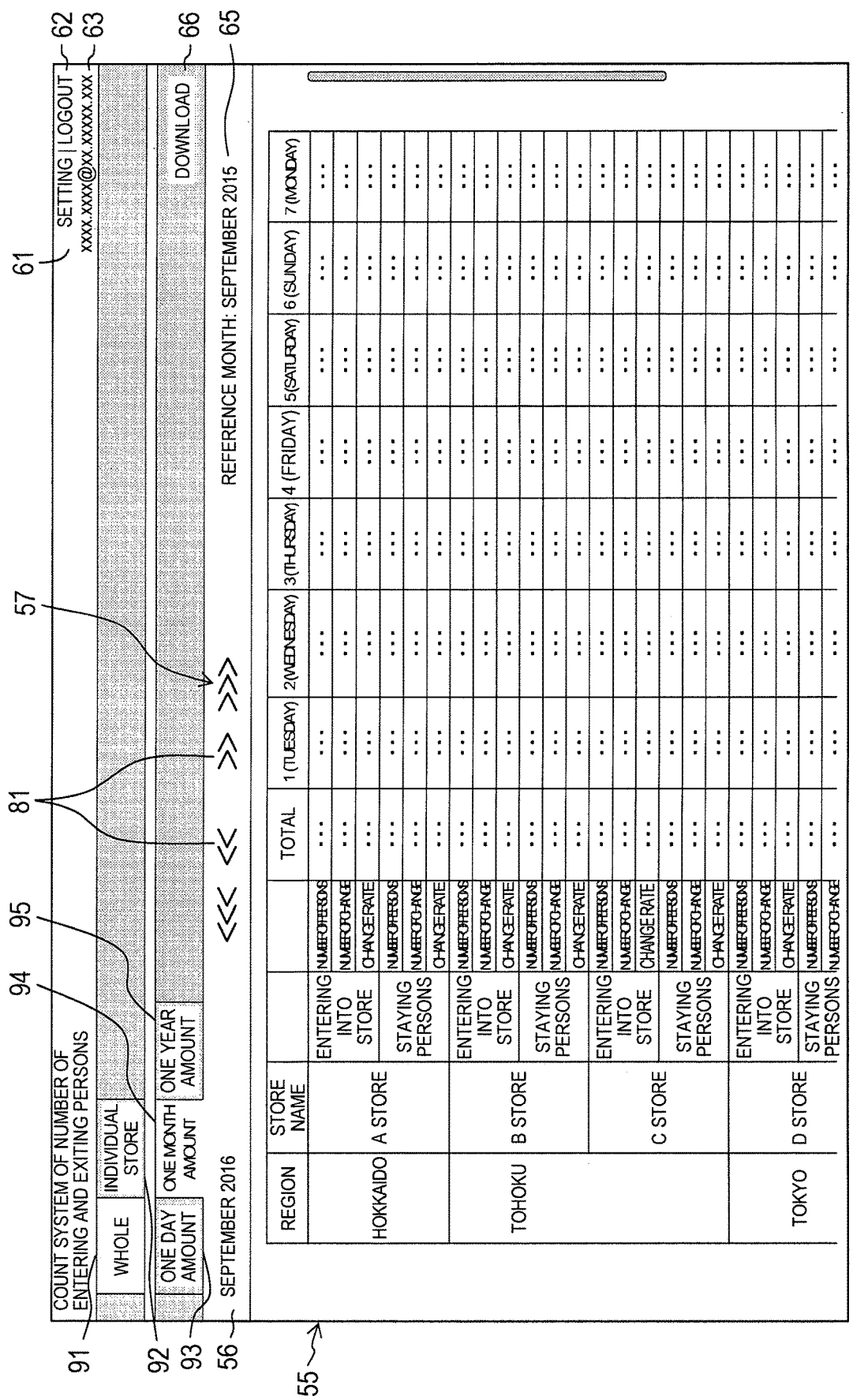
FIG. 16 is an explanatory diagram illustrating a whole monthly report screen.
Figure 17:
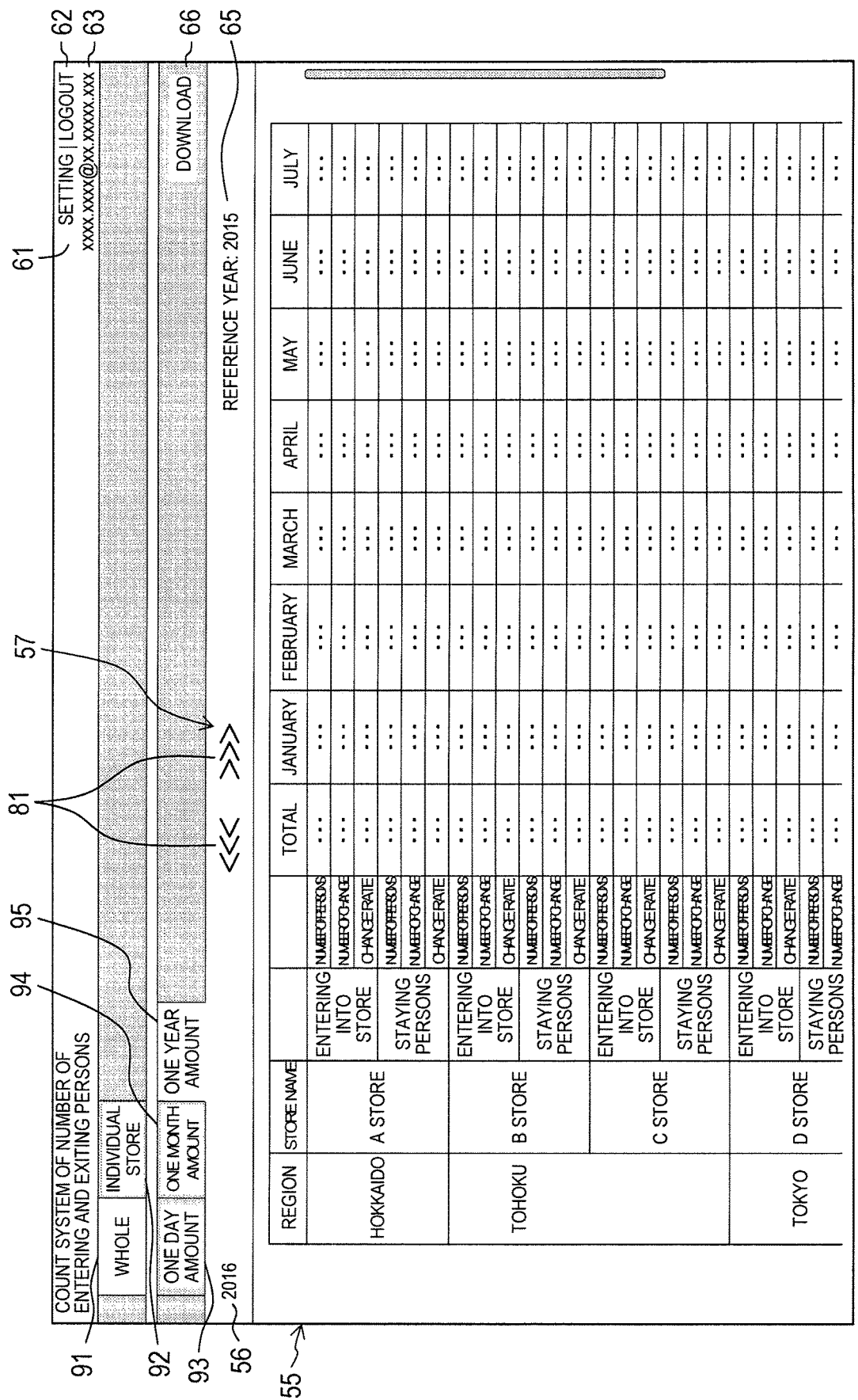
FIG. 17 is an explanatory diagram illustrating a whole annual report screen.
Figure 18:
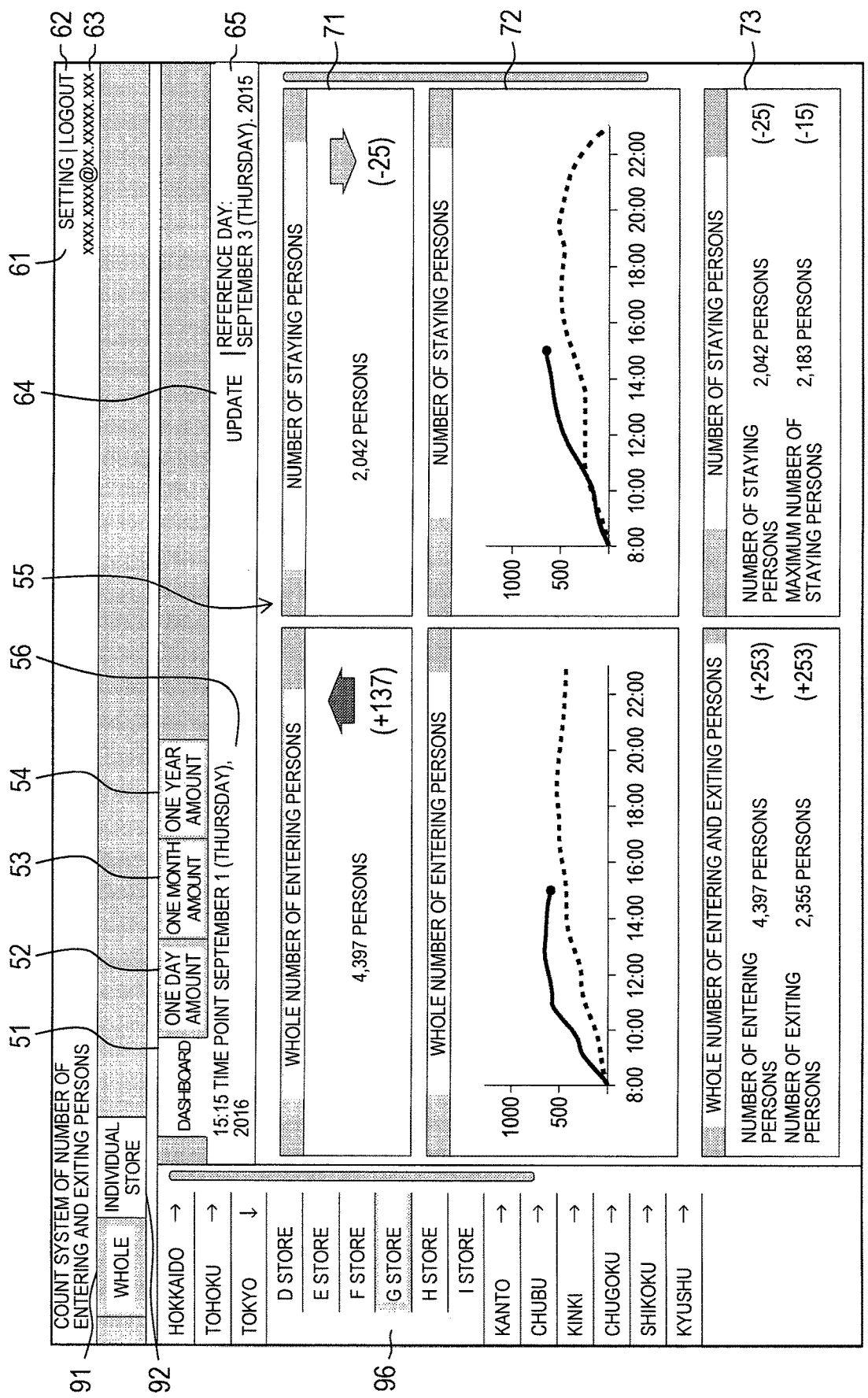
FIG. 18 is an explanatory diagram illustrating a store-by-store dashboard screen.
Figure 19:
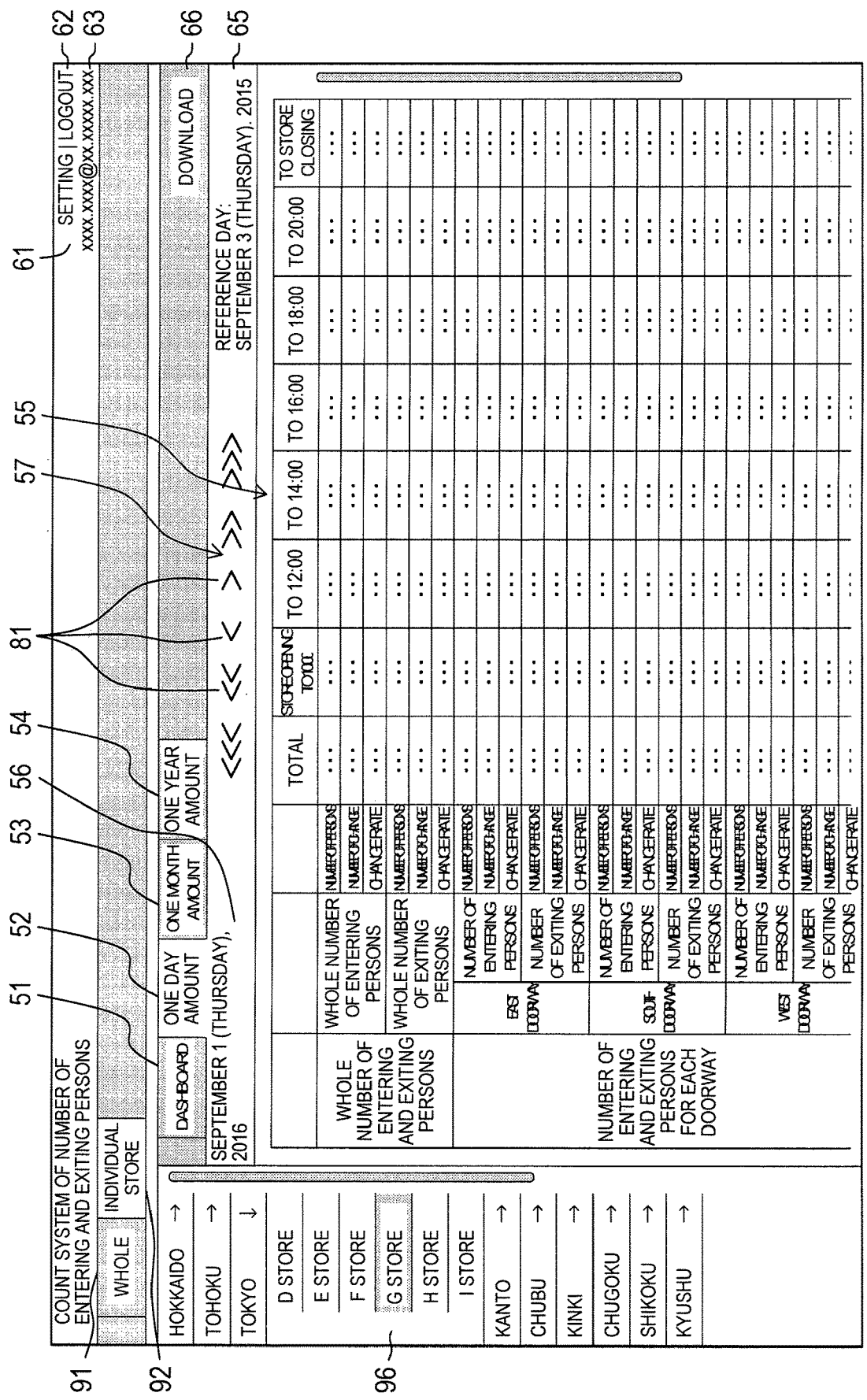
FIG. 19 is an explanatory diagram illustrating a store-by-store daily report screen.
Figure 20:
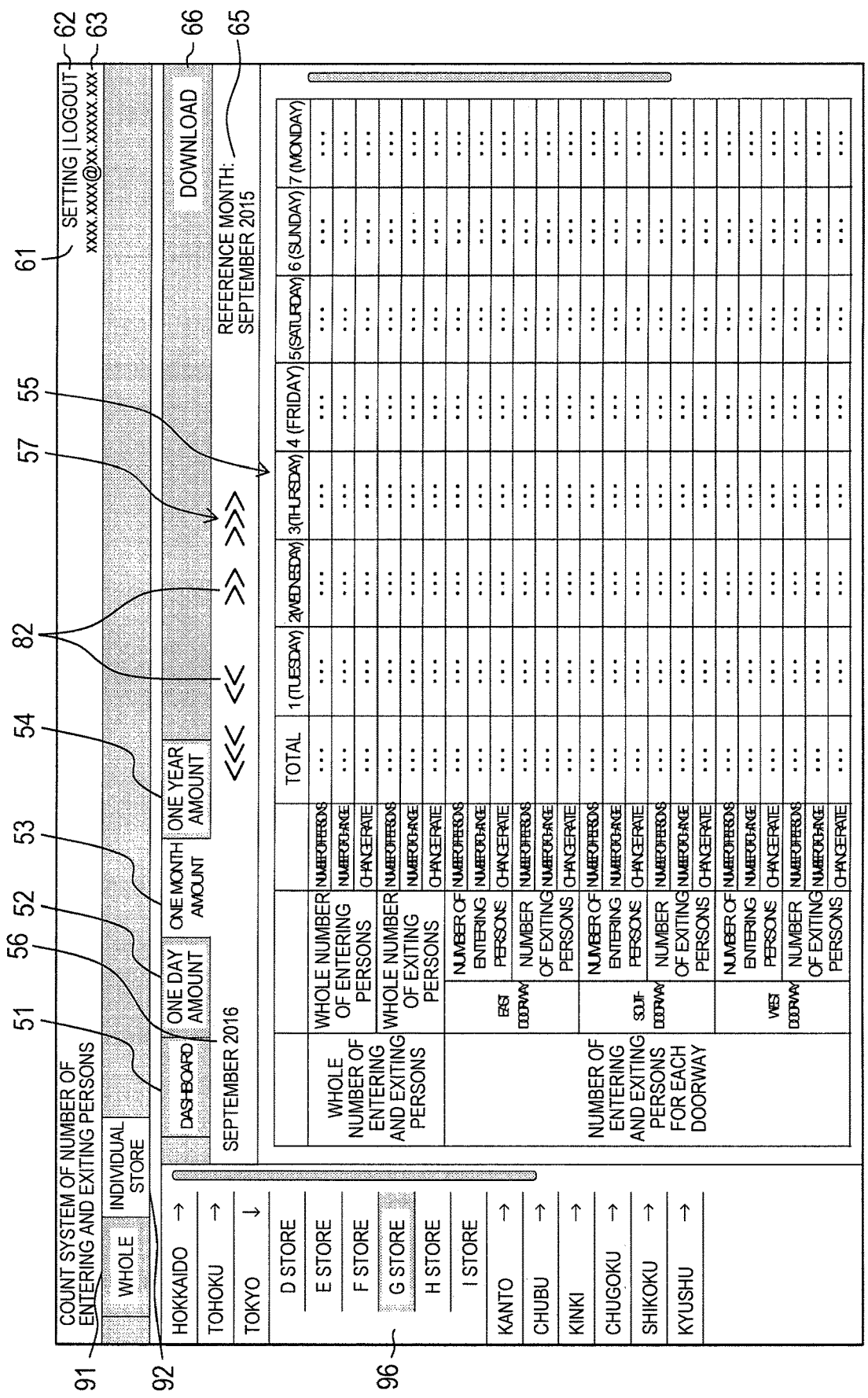
FIG. 20 is an explanatory diagram illustrating a store-by-store monthly report screen.

Next, a screen displayed in head office server 3 will be described. FIG. 14 is an explanatory diagram illustrating a transition state of the screen displayed in head office server 3. FIG. 15 is an explanatory diagram illustrating the whole daily report screen. FIG. 16 is an explanatory diagram illustrating the whole monthly report screen. FIG. 17 is an explanatory diagram illustrating the whole annual report screen. FIG. 18 is an explanatory diagram illustrating the store-by-store dashboard screen. FIG. 19 is an explanatory diagram illustrating the store-by-store daily report screen. FIG. 20 is an explanatory diagram illustrating the store-by-store monthly report screen. FIG. 21 is an explanatory diagram illustrating the store-by-store annual report screen.

As illustrated in FIG. 14, if head office server 3 starts a person number measurement application, a login screen is first displayed. The login screen is the same as the login screen (see FIG. 6) displayed in store server 2. If a user authentication is successful with the content input by the user on the login screen, the screen is changed to the browsing screen.

The browsing screen includes a whole browsing screen for displaying the whole statistical data of all the stores, and a store-by-store browsing screen for separately displaying the statistical data of each store. The whole browsing screen includes a whole daily report screen (see FIG. 15), a whole monthly report screen (see FIG. 16), and a whole annual report screen (see FIG. 17). The store-by-store browsing screen includes a store-by-store dashboard screen (see FIG. 18), a store-by-store daily report screen (see FIG. 19), a store-by-store monthly report screen (see FIG. 20), and a store-by-store annual report screen (see FIG. 21).

As illustrated in FIGS. 15 to 21, tab 91 of "whole" and tab 92 of "individual store" are provided on each browsing screen.

If tab 91 of "whole" is operated, the whole browsing screen is displayed. As illustrated in FIGS. 15 to 17, tab 93 of "one day amount", tab 94 of "one month amount", and tab 95 of "one year amount" are provided on the whole browsing screen, and by operating tabs 93 to 95, it is possible to switch the whole browsing screen. That is, if tab 93 of "one day amount" is operated, the screen changes to the whole daily report screen, and if tab 94 of "one month amount" is operated, the screen changes to the whole monthly report screen, and if tab 95 of "one year amount" is operated, the screen changes to the whole annual report screen. An initial screen initially displayed when tab 91 of "whole" is operated is the whole daily report screen.

If tab 92 of "store-by-store" is operated, a store-by-store browsing screen is displayed. As illustrated in FIGS. 18 to 21, tab 51 of "dashboard", tab 52 of "one day amount", tab 53 of one month amount", and tab 54 of "one year amount" are provided on the store-by-store browsing screen, and by operating tabs 51 to 54, the store-by-store browsing screen can be switched. That is, if tab 51 of "dashboard" is operated, the screen changes to the store-by-store dashboard screen, and if tab 52 of "one day amount" is operated, the screen changes to the store-by-store daily report screen, and if tab 53 of "one month amount" is operated, the screen changes to the store-by-store monthly report screen, and if tab 54 of "one year amount" is operated, the screen changes to the store-by-store annual report screen. An initial screen initially displayed when tab 92 of "individual store" is operated is the store-by-store dashboard screen.

Statistical data display section 55 is provided on each browsing screen, and the statistical data generated by processor 32 of head office server 3 is displayed in statistical data display section 55 of the whole browsing screen. The statistical data generated by processor 22 of store server 2 is displayed in statistical data display section 55 of the store-by-store browsing screen.

In the same manner as the browsing screen displayed in store server 2, button 61 of "setting" is provided on each browsing screen, and if button 61 is operated, the screen changes to a setting screen (not illustrated).

In the same manner as the browsing screen displayed in the store server 2, button 62 of "logout", logging-in user display section 63, and reference period display section 65 are provided on each browsing screen. Button 64 of "update" is provided on the store-by-store dashboard screen. In the same manner as the browsing screen displayed in store server 2, button 66 of "download" is provided on each browsing screen except for the store-by-store dashboard screen.

In the same manner as the browsing screen displayed in store server 2, aggregation period display section 56 and aggregation period switching section 57 are provided on each browsing screen except for the store-by-store dashboard screen (see FIG. 18).

As illustrated in FIG. 15, on the whole daily report screen, a list representing the statistical values for each time zone of each statistical item designated in each store of each region during the designated one day (aggregation period) is displayed in statistical data display section 55. In the example illustrated in FIG. 15, the screen is designated to display the statistical items of the number of entering persons and the number of staying persons, and the number of entering persons, the number of change and a change rate with respect to the reference period of the number of entering persons, the number of staying persons, and the number of change and a change rate with respect to the reference period of the number of staying persons are displayed. Examples illustrated in FIGS. 16 and 17 are the same as this example.

As illustrated in FIG. 16, on the whole monthly report screen, a list representing the statistical values for each day of each statistical item designated in each store of each region during the designated one month (aggregation period) is displayed in statistical data display section 55.

As illustrated in FIG. 17, on the whole annual report screen, a list representing the statistical values for each month of each statistical item designated in each store of each region during the designated one year (aggregation period) is displayed in statistical data display section 55.

Store list 96 is displayed on the store-by-store browsing screens when tab 92 of "individual store" is operated (the store-by-store dashboard screen (see FIG. 18), the store-by-store daily report screen (see FIG. 19), the store-by-store monthly report screen (see FIG. 20), and the store-by-store annual report screen (see FIG. 21)). All the stores are displayed by region in store list 96, and if any of the stores is selected from store list 96, statistical data relating to the selected store is displayed on statistical data display section 55.

As illustrated in FIG. 18, on the store-by-store dashboard screen, enlarged display section 71, graph display section 72, and detailed display section 73 are provided in statistical data display section 55. Enlarged display section 71, graph display section 72, and detail display section 73 are the same as on the dashboard screen (see FIGS. 7 and 8) displayed in store server 2.

As illustrated in FIG. 19, on the store-by-store daily report screen, a list representing the statistical values for each time zone of each statistical item designated during the designated one day (aggregation period) is displayed in statistical data display section 55. This list is the same as on the daily report screen (see FIGS. 9 to 11) displayed in store server 2.

As illustrated in FIG. 20, on the store-by-store monthly report screen, a list representing the statistical values for each day of each statistical item designated during the designated one month (aggregation period) is displayed in statistical data display section 55. This list is the same as on the monthly report screen (see FIG. 12) displayed in store server 2.

As illustrated in FIG. 21, on the store-by-store annual report screen, a list representing the statistical values for each month of each statistical item designated during the designated one year (aggregation period) is displayed in statistical data display section 55. This list is the same as on the annual report screen (see FIG. 13) displayed in store server 2.

As described above, the exemplary embodiment is described as an example of the technology disclosed in the present application. However, the technology in the present disclosure is not limited to this, and can also be applied to the exemplary embodiment in which change, replacement, addition, omission, and the like are made. A new exemplary embodiment can also be provided by combining the respective configuration elements described in the above exemplary embodiment.

For example, in the above-described exemplary embodiment, an example of a commercial facility such as a shopping mall is described, but a target facility is not limited to this, can be widely applied to a service area, a resort facility, a leisure facility such as a theme park, and the like, and can also be further applied to facilities other than the commercial facility such as a public facility.

In the above-described exemplary embodiment, as illustrated in FIG. 2, camera 1 is an omnidirectional camera having an image capture range of 360 degrees using a fisheye lens, but can also be a camera having a predetermined angle of view, a so-called box camera.

INDUSTRIAL APPLICABILITY

A facility operation assistance system, a facility image capture device, and a facility operation assistance method according to the present disclosure have effects that a server device collects measurement data of an image capture device with good timing, efficiently generates statistical data relating to the number of entering and exiting persons using the server device, and presents the data to a user, and is useful as a facility operation assistance system that presents statistical data relating to a situation of persons entering and exiting from a doorway of one or more facilities to a user, a facility image capture device arranged in a facility and connected to a server device via a network, a facility operation assistance method, and the like.

REFERENCE MARKS IN THE DRAWINGS

1 CAMERA (IMAGE CAPTURE DEVICE)
2 STORE SERVER (FIRST SERVER DEVICE)
3 HEAD OFFICE SERVER (SECOND SERVER DEVICE)
11 IMAGE CAPTURE UNIT
12 COMMUNICATION UNIT
13 PROCESSOR
14 STORAGE UNIT
21 COMMUNICATION UNIT
22 PROCESSOR
23 STORAGE UNIT
24 DISPLAY
31 COMMUNICATION UNIT
32 PROCESSOR
33 STORAGE UNIT
34 DISPLAY

The invention claimed is:

1. A facility operation assistance system presenting statistical data relating to a situation of persons entering and exiting from doorways of a plurality of facilities to a user, the system comprising:
   a plurality of image capture devices that are arranged in the plurality of facilities;
   a plurality of first servers, each first server being disposed in a facility of the plurality of facilities and connected to the image capture device in the facility via a network; and
   a second server that is connected to the plurality of first servers via a network,
   wherein each image capture device of the plurality of image capture devices includes:
      an image capture unit capturing an image of a periphery of a doorway of a corresponding facility,
      a processor detecting persons entering and exiting from the doorway based on captured images that are sequentially output from the image capture unit and generating measurement data relating to a number of entering and exiting persons for each predetermined period, and
      a communication unit transmitting the measurement data for each predetermined period which is output from the processor to the first server in the corresponding facility,
   wherein the first server includes:
      a communication unit receiving the measurement data for each predetermined period which is transmitted from the image capture device in the corresponding facility,
      a storage accumulating the measurement data for each predetermined period that is received by the communication unit of the first server, and a processor statistically processing the measurement data for each predetermined period to generate the statistical data for targeting the corresponding facility, wherein the second server includes:
- a communication unit receiving the measurement data from the plurality of first servers,
- a storage accumulating the measurement data received from the plurality of first servers by the communication unit of the second server, and
- a processor statistically processing the measurement data to generate the statistical data for targeting a whole of the plurality of facilities, and displaying a browsing screen based on the statistical data for targeting the whole of the plurality of facilities and the statistical data for targeting each of the plurality of facilities, wherein the browsing screen includes a first tab to display a whole browsing screen including the statistical data for targeting the whole of the plurality of facilities, and a second tab to display an individual browsing screen including the statistical data for targeting an individual facility of the plurality of facilities, wherein, when the second tab is operated by the user, the individual browsing screen is displayed, the individual browsing screen further including a facility list to cause the user to select the individual facility from the plurality of facilities, and a dashboard tab to display a dashboard screen in which the statistical data for a dashboard period from an opening time of a current day to a current time of the individual facility is displayed, and wherein, when the first tab is operated by the user, the whole browsing screen is displayed, the whole browsing screen not including the facility list and the dashboard tab.

2. The facility operation assistance system of claim 1, wherein the first server makes a transmission request of the measurement data to the image capture device in the corresponding facility for each predetermined period, and
wherein the image capture device transmits the measurement data for each predetermined period to the first server in response to the transmission request.

3. The facility operation assistance system of claim 1, wherein the processor of the first server generates the statistical data including the number of entering and exiting persons for each of a plurality of doorways that are provided in the corresponding facility.

4. The facility operation assistance system of claim 1, wherein the processor of the first server generates the statistical data including at least one of a number of staying persons at the corresponding facility and a staying time, based on the number of entering and exiting persons.

5. The facility operation assistance system of claim 1, wherein the processor of the second server presents the statistical data which is statistically processed during a designated aggregation period based on an operation input of the user designating the aggregation period.

6. The facility operation assistance system of claim 1, wherein the processor of the second server presents the statistical data relating to a selected facility based on an operation input of a user selecting the facility from the facility list.

7. The facility operation assistance system of claim 1, wherein the browsing screen includes an enlarged display section that displays:
- the statistical data of an aggregation period of a designated statistical item as a large size character,
- an amount of change of the statistical data of the aggregation period with respect to the statistical data of a reference period, and
- an icon representing the change of the statistical data of the aggregation period with respect to the statistical data of a reference period, the icon including one of an upward arrow and a downward arrow respectively representing an increase and decrease of the statistical data of the aggregation period with respect to the reference period.

8. The facility operation assistance system of claim 1, wherein
the dashboard screen includes an enlarged display section, a graph display section, and a detailed display section,
the enlarged display section displays:
- the statistical data of a designated statistical item of the dashboard period as a large size character,
- an amount of change of the statistical data of the designated statistical item of the dashboard period with respect to a reference period,
- an icon representing the change of the statistical data of the dashboard period with respect to the reference period, the icon including one of an upward arrow and a downward arrow respectively representing an increase and decrease of the statistical data of the designated statistical item of the dashboard period with respect to the reference period, the graph display section displays a graph representing a transition situation of the statistical data of the designated statistical item during the dashboard period, and a graph representing a transition situation of the statistical data of the designated statistical item during the reference period, and
the detailed display section displays the statistical data of a plurality of designated statistical items of the dashboard period.

9. The facility operation assistance system of claim 8, wherein the dashboard screen further includes an update button,
when the update button is operated, the current time of the dashboard period is updated, and the dashboard screen is updated to display the statistical data of the updated current time of the dashboard period.

10. The facility operation assistance system of claim 1, wherein
the browsing screen includes a reference period display section in which a reference period is displayed,
the browsing screen further includes a display section in which an amount of change of the statistical data of the reference period with respect to the statistical data of an aggregation period is displayed.

11. The facility operation assistance system of claim 10, wherein the aggregation period is selected one of the dashboard period, a day, a month and a year, and
the reference period display section displays:
- a reference date when the aggregation period is the dashboard period or the day,
- a reference month when the aggregation period is the month, or
- a reference year when the aggregation period is the year.

12. The facility operation assistance system of claim 10, wherein
the reference period is designated by the user by operating the reference period display section.

13. A facility operation assistance method of presenting statistical data relating to a situation of persons entering and exiting from doorways of a plurality of facilities to a user, wherein the facility operation assistance method being performed by a system including:
a plurality of image capture devices that are arranged in the plurality of facilities;
a plurality of first servers, each first server being disposed in a facility of the plurality of facilities and connected to the image capture device in the facility via a network; and
a second server that is connected to the plurality of first servers via a network,
wherein the facility operation assistance method comprises:
capturing and sequentially outputting, by each image capture device of the plurality of image capture devices, images of a periphery of a doorway of a corresponding facility,
detecting, by the image capture device, persons entering and exiting from the doorway based on the captured and sequentially output images,
generating, by the image capture device, measurement data relating to a number of entering and exiting persons for each predetermined period, and
transmitting, by the image capture device, the generated measurement data for each predetermined period to the first server in the corresponding facility,
receiving, by the first server, the measurement data which is transmitted from the image capture device in the corresponding facility for each predetermined period,
accumulating, by the first server, the received measurement data for each predetermined period in a first storage, and
statistically processing by the first server, the measurement data for each predetermined period to generate the statistical data for targeting the corresponding facility,
receiving, by the second server, the measurement data from the plurality of first servers,
accumulating, by the second server, the measurement data received from the plurality of first servers in a second storage,
statistically processing, by the second server, the measurement data received by the second server to generate the statistical data for targeting a whole of the plurality of facilities, and
displaying, by the second server, a browsing screen based on the statistical data for targeting the whole of the plurality of facilities and the statistical data for targeting each of the plurality of facilities,
wherein the browsing screen includes a first tab to display a whole browsing screen including the statistical data for targeting the whole of the plurality of facilities, and a second tab to display an individual browsing screen including the statistical data for targeting an individual facility of the plurality of facilities,
wherein, when the second tab is operated by the user, the individual browsing screen is displayed, the individual browsing screen further including a facility list to cause the user to select the individual facility from the plurality of facilities, and a dashboard tab to display a dashboard screen in which the statistical data for a period from an opening time of a current day to a current time of the individual facility is displayed, and
wherein, when the first tab is operated by the user, the whole browsing screen is displayed, the whole browsing screen not including the facility list and the dashboard tab.

* * * * *